US010727532B2

(12) United States Patent
Endo et al.

(10) Patent No.: US 10,727,532 B2
(45) Date of Patent: Jul. 28, 2020

(54) POSITIVE ACTIVE MATERIAL FOR LITHIUM SECONDARY BATTERY, METHOD FOR PRODUCING PRECURSOR OF POSITIVE ACTIVE MATERIAL, METHOD FOR PRODUCING POSITIVE ACTIVE MATERIAL, POSITIVE ELECTRODE FOR LITHIUM SECONDARY BATTERY, AND LITHIUM SECONDARY BATTERY

(71) Applicant: GS Yuasa International Ltd., Kyoto-shi, Kyoto (JP)

(72) Inventors: Daisuke Endo, Kyoto (JP); Takashi Shimizu, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 106 days.

(21) Appl. No.: 16/061,953

(22) PCT Filed: Dec. 14, 2016

(86) PCT No.: PCT/JP2016/087163
§ 371 (c)(1),
(2) Date: Jun. 13, 2018

(87) PCT Pub. No.: WO2017/104688
PCT Pub. Date: Jun. 22, 2017

(65) Prior Publication Data
US 2018/0366773 A1 Dec. 20, 2018

(30) Foreign Application Priority Data

Dec. 15, 2015 (JP) .................................. 2015-244008
Aug. 22, 2016 (JP) .................................. 2016-161909

(51) Int. Cl.
*H01M 4/52* (2010.01)
*H01M 4/50* (2010.01)
(Continued)

(52) U.S. Cl.
CPC ...... *H01M 10/0525* (2013.01); *C01G 53/006* (2013.01); *C01G 53/50* (2013.01);
(Continued)

(58) Field of Classification Search
CPC ............ H01M 4/52; H01M 4/50; H01M 4/38; H01M 10/04; H01M 10/0525
See application file for complete search history.

(56) References Cited

U.S. PATENT DOCUMENTS 7,604,898 B2   10/2009   Yuasa
7,824,803 B2   11/2010   Suhara
(Continued)

FOREIGN PATENT DOCUMENTS

EP   1391950 A1   2/2004
EP   2144314 A2   1/2010
(Continued)

OTHER PUBLICATIONS

Yabuuchi, Naoaki et al., "Solid-State Chemistry and Electrochemistry of LiCo1/3Ni1/3Mn1/3O2 for Advanced Lithium-Ion Batteries: III. Rechargeable Capacity and Cycleability," Journal of the Electrochemical Society, Feb. 16, 2007, p. 314-321, vol. 154 No. 4, Electrochemical Society, U.S.A.; Cited in Specification.
(Continued)

*Primary Examiner* — Kenneth J Douyette
(74) *Attorney, Agent, or Firm* — Rankin, Hill & Clark LLP

(57) ABSTRACT

The positive active material for a lithium secondary battery includes a lithium transition metal composite oxide having an $\alpha$-NaFeO$_2$ structure, and having a diffraction peak at $2\theta=44\pm1°$ and a diffraction peak at $2\theta=18.6\pm1°$ in a powder X-ray diffraction diagram using a CuK$\alpha$ ray. In a ratio FWHM (003)/FWHM (104) of a full width at half maximum FWHM (003) for the diffraction peak at $2\theta=18.6\pm1°$ to a full
(Continued)

width at half maximum FWHM (104) for the diffraction peak at 2θ=44±1°, a ratio of FWHM (003)/FWHM (104) in a charge state immediately after a discharge state to FWHM (003)/FWHM (104) in the discharge state is 0.72 or more.

14 Claims, 5 Drawing Sheets

(51) Int. Cl.

| H01M 4/38 | (2006.01) |
|---|---|
| H01M 10/0525 | (2010.01) |
| H01M 4/525 | (2010.01) |
| H01M 4/505 | (2010.01) |
| H01M 10/0566 | (2010.01) |
| H01M 10/052 | (2010.01) |
| C01G 53/00 | (2006.01) |
| H01M 10/04 | (2006.01) |
| H01M 10/056 | (2010.01) |

(52) U.S. Cl.
CPC ............ *H01M 4/382* (2013.01); *H01M 4/50* (2013.01); *H01M 4/505* (2013.01); *H01M 4/52* (2013.01); *H01M 4/525* (2013.01); *H01M 10/0431* (2013.01); *H01M 10/052* (2013.01); *H01M 10/056* (2013.01); *H01M 10/0566* (2013.01); *C01P 2002/50* (2013.01); *C01P 2002/52* (2013.01); *C01P 2002/72* (2013.01); *C01P 2002/76* (2013.01); *C01P 2002/77* (2013.01); *C01P 2002/85* (2013.01); *C01P 2004/34* (2013.01); *C01P 2006/11* (2013.01)

(56) References Cited

U.S. PATENT DOCUMENTS

| 7,910,246 | B2 | 3/2011 | Yuasa | |
|---|---|---|---|---|
| 7,981,547 | B2 | 7/2011 | Suhara | |
| 8,097,363 | B2 | 1/2012 | Yuasa | |
| 9,048,495 | B2 | 6/2015 | Sun | |
| 9,184,443 | B2 | 11/2015 | Lee | |
| 2006/0263690 | A1 | 11/2006 | Suhara | |
| 2007/0259266 | A1 | 11/2007 | Yuasa | |
| 2010/0159325 | A1* | 6/2010 | Sugiura | C01G 53/50 429/223 |
| 2011/0123865 | A1* | 5/2011 | Kepler | C03C 3/14 429/220 |
| 2012/0077064 | A1 | 3/2012 | Sasakawa | |
| 2012/0315544 | A1 | 12/2012 | Yasuda | |
| 2014/0038053 | A1 | 2/2014 | Endo | |
| 2014/0058598 | A1 | 2/2014 | Matsui | |
| 2014/0170524 | A1* | 6/2014 | Chiang | H01M 8/188 429/482 |
| 2014/0234700 | A1* | 8/2014 | Moriwaka | H01M 4/136 429/199 |
| 2016/0240846 | A1 | 8/2016 | Endo | |

FOREIGN PATENT DOCUMENTS

| EP | 2457873 | A1 | 5/2012 |
|---|---|---|---|
| EP | 2736106 | A2 | 5/2014 |
| JP | 3233352 | A2 | 11/2001 |
| JP | 2004119218 | A | 4/2004 |
| JP | 2005005105 | A | 1/2005 |
| JP | 2006261127 | A | 9/2006 |
| JP | 2008536285 | A | 9/2008 |
| JP | 2008293988 | A | 12/2008 |
| JP | 2013073826 | A | 4/2013 |
| JP | 2014044928 | A | 3/2014 |
| JP | 2014203509 | A | 10/2014 |
| JP | 2015018803 | A | 1/2015 |
| JP | 2015043332 | A | 3/2015 |
| JP | 2015084273 | A | 4/2015 |
| WO | 2011111364 | A1 | 9/2011 |
| WO | 2015049862 | A1 | 4/2015 |

OTHER PUBLICATIONS

Kim, G.H. et al., "Improvement of High-Voltage Cycling Behavior of Surface-Modified Li [ Ni1/3Co1/3Mn1/3] O2 Cathodes by Fluorine Substitution for Li-Ion Batteries," Journal of the Electrochemical Society, Jul. 21, 2005, p. A1707-A1713, vol. 152 No. 9, Electrochemical Society, U.S.A.; Cited in Specification.

Kim, Yoojung et al., "Comparison of Structural Changes in Fully Delithiated Li x [ Ni1/3Co1/3Mn1/3] O2 and Li x [ Ni0.33Co0.33Mn0.30Mg0.04 ]O1.96F0.04 Cathodes (x=0) upon Thermal Annealing," Journal of The Electrochemical Society, Apr. 19, 2007, p. A561-565, vol. 154 No. 6, Electrochemical Society, U.S.A.; Cited in Specification.

Jouanneau, S., "Influence of LiF Additions on Li [ Ni x Co1—2x Mn x ] O 2 Materials: Sintering, Structure, and Lithium Insertion Properties," Journal of The Electrochemical Society, Sep. 27, 2004, p. A1749-A1754, vol. 151 No. 10, Electrochemical Society, U.S.A.; Cited in Specification.

International Search Report dated Feb. 21, 2017 filed in PCT/JP2016/087163.

* cited by examiner

POSITIVE ACTIVE MATERIAL FOR LITHIUM SECONDARY BATTERY, METHOD FOR PRODUCING PRECURSOR OF POSITIVE ACTIVE MATERIAL, METHOD FOR PRODUCING POSITIVE ACTIVE MATERIAL, POSITIVE ELECTRODE FOR LITHIUM SECONDARY BATTERY, AND LITHIUM SECONDARY BATTERY

TECHNICAL FIELD

The present invention relates to a positive active material for a lithium secondary battery, a method for producing a precursor of a positive active material, method for producing a positive active material, a positive electrode for a lithium secondary battery, and a lithium secondary battery.

BACKGROUND ART

Heretofore, as a positive active material for a lithium secondary battery, a lithium transition metal composite oxide having an α-NaFeO$_2$-type crystal structure has been examined, and lithium secondary batteries including LiCoO$_2$ have been widely put to practical use. However, the discharge capacity of LiCoO$_2$ is about 120 to 130 mAh/g. In addition, as a transition metal that forms the lithium transition metal composite oxide, it has been desired to use Mn that is abundant as an earth resource. However, there is the problem that when the molar ratio (Mn/Me) of Mn in the transition metal (Me) that forms the lithium transition metal composite oxide is more than 0.5, the structure is changed to a spinel type-structure when the battery is charged, and thus it is unable to maintain a crystal structure, resulting in very poor charge-discharge cycle performance.

In view of this, various materials which are excellent in charge-discharge cycle performance and in which the molar ratio (Mn/Me) of Mn in the transition metal that forms the lithium transition metal composite oxide is 0.5 or less have been proposed as positive active materials. For example, a positive active material containing LiNi$_{1/2}$Mn$_{1/2}$O$_2$ or LiNi$_{1/3}$Co$_{1/3}$Mn$_{1/3}$O$_2$ has a discharge capacity of 150 to 180 mAh/g, and some of such positive active materials have been put to practical use.

The charge-discharge cycle performance of a battery including the above-mentioned lithium transition metal composite oxides as a positive active material is known to depend on the type and composition of an element that forms the transition metal, as well as the crystal structure of the active material, powder characteristics, a surface treatment and so on.

Non-Patent Document 1 suggests that a positive active material including LiNi$_{1/3}$Co$_{1/3}$Mn$_{1/3}$O$_2$ has a small unit volume change associated with a charge-discharge cycle.

In addition, inventions are known in which a full width at half maximum for a diffraction peak attributed to the (003) plane and the (104) plane of a positive active material containing a lithium transition metal composite oxide is specified (see Patent Documents 1 to 4).

Patent Document 1 discloses "a lithium secondary battery comprising a positive electrode and a negative electrode, the positive electrode including a positive active material of hollow structure which has a shell portion, and a hollow portion formed in the shell portion, the positive active material satisfying the following requirements: the positive active material contains a lithium transition metal oxide having a layered crystal structure, and the lithium transition metal oxide contains at least one metal element M$_T$ among Ni, Co and Mn; the ratio (A/B) of a full width at half maximum A for a diffraction peak given by the (003) plane and a full width at half maximum B for a diffraction peak given by the (104) plane is 0.7 or less a powder X-ray diffraction pattern using a CuKα ray; and the content of a compound containing Li and CO$_3$ is 0.2% by mass or less" (claim 1).

Patent Document 2 discloses "a positive active material for a lithium secondary battery which comprises a lithium transition metal composite oxide represented by the composition formula: Li$_{1+\alpha}$Me$_{1-\alpha}$O$_2$ (Me is a transition metal element including Co, Ni and Mn, and 1.2<(1+α)/(1−α) <1.6), wherein in the lithium transition metal composite oxide, the molar ratio (Co/Me) of Co to the Me is 0.24 to 0.36, and when the space group R3-m is used as a crystal structure model on the basis of an X-ray diffraction pattern, the full width at half maximum for the diffraction peak attributed to the (003) plane is in a range of 0.204° to 0.303°, or the full width at half maximum for the diffraction peak attributed to the (104) plane is in a range of 0.278° to 0.424°" (claim 1).

In addition, Patent Document 3 discloses "a positive active material comprising at least one secondary particle including an aggregate of two or more primary particles, wherein the secondary particle contains a nickel-based lithium transition metal oxide, the primary particle has an average particle size of 3 to 5 μm, the secondary particle includes at least one selected from a small-diameter secondary particle having an average particle size of 5 to 8 μm and a large-diameter secondary particle having an average particle size of 10 to 20 μm, and the full width at half maximum for the (003) peak is 0.120 to 0.125° in X-ray diffraction analysis spectroscopic analysis" (claim 1), and "the positive active material according to claim 1, wherein in X-ray diffraction analysis spectroscopic analysis, the full width at half maximum for the (104) peak is 0.105 to 0.110°, and the full width at half maximum for the (110) peak is 0.110 to 0.120°" (claim 2).

Patent Document 4 suggests that examples of the positive active material containing a lithium transition metal composite oxide having an α-NaFeO$_2$-type crystal structure include Li$_{1.02}$Mn$_{0.45}$Ni$_{0.45}$Co$_{0.10}$O$_2$ (C9), Li$_{1.02}$Mn$_{0.30}$Ni$_{0.30}$Co$_{0.40}$O$_2$ (C10), Li$_{1.02}$Mn$_{0.40}$Ni$_{0.50}$Co$_{0.10}$O$_2$ (C11), Li$_{1.00}$Mn$_{0.20}$Ni$_{0.70}$Co$_{0.10}$O$_2$ (C13) and Li$_{0.99}$Mn$_{0.50}$Ni$_{0.44}$Co$_{0.06}$O$_2$ (C14), which have full widths at half maximum for the diffraction peak of 0.142°, 0.125°, 0.134°, 0.134° and 0.130°, respectively, at 44.1±1° (see claims 7 and 8, paragraphs [0698] to [0701], [0719] to [0722], [0740] to [0743], [0782] to [0785], [0803] to [0806], and Tables 3 and 5).

In addition, Patent Document 4 suggests that "the positive active material according to claim 7 is characterized in that the full width at half maximum for the diffraction peak at 2θ:18.6±1° is 0.05° to 0.20°, and the full width at half maximum for the diffraction peak at 2θ:44.1±1° is 0.10° to 0.20°" (paragraph [0071]), and "with the configuration, there can be provided a positive active material making it possible to produce a nonaqueous electrolyte secondary battery having a high energy density (high discharge capacity) and excellent charge-discharge cycle performance" (paragraph [0072]).

Patent Document 5 suggests that a specific element is caused to exist on the surfaces of particles in a positive active material in the following text "[Example 13] Except that a titanium oxide powder and a lithium fluoride powder were further added in mixing of two compounds: cobalt hydroxide and lithium carbonate in Example 10, the same procedure as in Example 11 was carried out to synthesize a positive active material. The result of elemental analysis showed $LiCo_{0.997}Ti_{0.003}O_{1.998}F_{0.002}$. The particle size distribution of a powder with the above-described composition, which was formed by aggregation of primary particles obtained by crushing a fired product of the positive active material, was measured with water as a dispersion medium using a laser scattering particle size distribution measuring device, the result showed that average particle sizes D50, D10 and D90 were 13.2 μm, 10.1 μm and 16.3 μm, respectively, and a substantially spherical $LiCoO_2$ powder having a specific surface area of 0.48 $m^2$/g as determined by a BET method was obtained. For the powder, an X-ray diffraction spectrum was obtained using an X-ray diffraction apparatus (RINT 2100 Model manufactured by Rigaku Denki Co., Ltd.). In powder X-ray diffraction using a CuKα ray, the full width at half maximum for the diffraction peak of the (110) plane at 2 η=66.5±1° was 0.125°. When the powder was pressed at 0.3 t/$cm^2$ by a hydraulic press machine, the apparent density after pressing was 3.26 g/$cm^3$. The result of examination by spectroscopic analysis showed that titanium and fluorine were localized on the surface." (paragraphs [0063] and [0064]).

Patent Document 6 also suggests that a specific element is caused to exist on the surfaces of particles in a positive active material in the following text "[Example 14] 196.72 g of cobalt oxyhydroxide having a Co content of 60.0% by mass and an average particle size of 13 μm, 74.71 g of lithium carbonate having a Li content of 18.7% by mass and an average particle size of 5.6 μm, 0.79 g of aluminum hydroxide having an Al content of 34.45% by mass, and 0.10 g of lithium fluoride were mixed in a mortar, and the resulting mixture was fired in air at 1000° C. for 10 hours to obtain a powder of a lithium cobalt-containing composite oxide. The composition of the resulting lithium cobalt-containing composite oxide was $LiCo_{0.995}Al_{0.005}O_{1.998}F_{0.002}$. The ratio Li/(Co+M) was 1.00. Subsequently, an aqueous solution of diammonium hydrogenphosphate was sprayed to the resulting lithium cobalt-containing composite oxide in such a manner that the concentration of phosphorus was 1 mol %, the mixture was then mixed, and the resulting mixture was heat-treated at 900° C. for 12 hours to obtain a positive active material. The resulting positive active material had an average particle size D50 of 14.3 μm and a specific surface area of 0.22 $m^2$/g. For the resulting positive active material, an X-ray diffraction spectrum measured in the same manner as in Example 1 was analyzed using a powder X-ray diffraction method, and elemental analysis of a particle cross-section of the positive active material was performed using EPMA. As a result, it was able to confirm that the surfaces of particles of the lithium cobalt-containing composite oxide as a parent material had orthorhombic lithium phosphate having a composition of $Li_3PO_4$." (paragraphs [0101] and [0102]).

Meanwhile, it is known that in production of a positive active material, ammonium fluoride or lithium fluoride is used for a lithium transition metal composite oxide (see Patent Documents 7 and 8).

According to Example 3 in Patent Document 7, "2 mol % $LiNO_3$ was dissolved in 150 ml of distilled water in a 500 ml beaker, a commercially available $LiCoO_2$ active material was carried therein, and the mixture was then stirred. Separately, 150 ml of a 2 mol % $NH_4F$ solution was continuously supplied to the solution at a flow rate of 1 ml/min while the temperature of a reactor was kept at 80° C., a coprecipitation reaction was carried out, and the mixture was then stirred for 24 hours. Here, the average temperature of the reactor was kept at 80° C. The reason why the temperature of the coprecipitation reaction is kept high as described above is that by coprecipitation of LiF, a precipitate having a high dispersion degree can be obtained in a complex salt state at a high temperature. The $LiCoO_2$ active material coated with a fluorine compound was washed with distilled water, dried in a hot air thermostatic bath at 110° C. for 12 hours, and then heat-treated at 400° C. under an inert atmosphere to obtain final LiF coated $LiCoO_2$. (paragraph [0048])"

According to Example 4 in Patent Document 8, "8 L of water was added in a closed reaction bath, and held at 45° C. while a nitrogen gas was circulated. Further, a mixed sulfate aqueous solution of Ni, Co and Mn and a sodium carbonate aqueous solution were continuously added with stirring in such a manner that the pH was 8.0 (±0.1). A reaction was carried out while during the reaction, only a filtrate was discharged to the outside of the system by a concentrator, and a solid component was retained in the reaction bath, and a coprecipitation product slurry was then collected. The collected slurry was filtered, washed with water, and dried at 100° C. overnight to obtain a coprecipitation precursor powder" (paragraph [0101]), and "The resulting coprecipitation precursor and the lithium carbonate powder were weighed, and thoroughly mixed. The mixture was fired for 10 hours at 870° C. under circulation of air in an electric furnace to obtain an intermediate fired product. 100 g of the intermediate fired product was added to 20 ml of a 0.95 mol/l ammonium fluoride aqueous solution held at 30° C. with stirring. Next, 3 ml of a mixed aqueous solution adjusted so as to have a sulfuric acid concentration of 0.05 mol/l, an aluminum sulfate concentration of 1 mol/l and a manganese sulfate concentration of 1 mol/l was added dropwise to the intermediate fired product slurry, filtered, washed with water, and dried at 90° C. The resulting product was fired at 450° C. for 3 hours under circulation of air in an electric furnace to obtain a positive active material particle powder" (paragraph [0102]).

In addition, it is also known that in production of a positive active material as described above, a salt of a strong acid such as lithium nitrate or lithium fluoride is used (see, for example, paragraphs [0117] to [0118] in Patent Document 8 and claim 7 in Patent Document 9).

It is also known that when LiF is mixed as a sintering aid at the time of sintering a transition metal hydroxide coprecipitation precursor and lithium hydroxide in a lithium transition metal composite oxide synthesizing step, the density is increased, and structure stability associated with charge-discharge is attained (see, for example, Non-Patent Documents 2 to 4).

Further, regarding the porosity of a positive active material, Patent Document 10 discloses a positive electrode material in which a plurality of primary particles are aggregated to form secondary particles, the secondary particles has a porosity of 2.5 to 35%, and the secondary particles include crystals having a layer structure of a composite oxide represented by $Li_aMn_xNi_yCo_zO_2$, where $1 \leq a \leq 1.2$, $0 \leq x \leq 0.65$, $0.35 \leq y < 0.5$, $0 \leq z \leq 0.65$ and x+y+z=1 (claims 3 and 5).

In addition, according to Patent Document 10, "FIG. 3 is a diagram showing a relationship between the porosity and the discharge capacity. When the porosity is 2.5% or less, the discharge capacity at room temperature is as low as 100 mAh/g, and on the other hand, when the porosity is more than 35%, the discharge capacity at a low temperature of −30° C. is sharply reduced. However, when the porosity is 2.5 to 35% as in the present invention, a high discharge capacity of about 150 mAh/g at 25° C. and 10 mAh/g or more at −30° C. can be obtained" (paragraph [0029]). Example 1 in Patent Document 10 suggests that a positive electrode material in which "the ratios Ni:Mn:Co and Li: (NiMnCo) are 1:1:1 and 1.02:1 in terms of an atomic ratio" (paragraph [0022]) is 3.6% (see Table 2).

PRIOR ART DOCUMENTS

Patent Documents

Patent Document 1: JP-A-2015-43332
Patent Document 2: JP-A-2014-44928
Patent Document 3: JP-A-2015-18803
Patent Document 4: JP-A-2008-293988
Patent Document 5: JP-A-2004-119218
Patent Document 6: JP-A-2015-84273
Patent Document 7: JP-A-2008-536285
Patent Document 8: JP-A-2014-203509
Patent Document 9: JP-A-2006-261127
Patent Document 10: JP-A-2005-5105

Non-Patent Documents

Non-Patent Document 1: J. Electrochem. Soc., Yabuuchi et al, 154(4), A314-A321 (2007)
Non-Patent Document 2: J. Electrochem. Soc., Kim et al, 152(9), A1707-A1713 (2005)
Non-Patent Document 3: J. Electrochem. Soc., Kim et al, 154(6), A561-A565 (2007)
Non-Patent Document 4: J. Electrochem. Soc., Jouanneau et al, 151, 1749 (2004)

DISCLOSURE OF THE INVENTION

Problems to be Solved by the Invention

One of factors that affect charge-discharge cycle performance is cracks of particles due to repeated expansion and shrinkage of positive active material particles with insertion/extraction of lithium ions.

Among $LiMeO_2$-type positive active materials, a positive active material in which the ratio of Ni, Co and Mn is 1/1/1 ($LiNi_{1/3}Co_{1/3}Mn_{1/3}O_2$) is known as a material having small volume expansion and shrinkage associated with charge-discharge (see Non-Patent Document 1). However, even in the case of $LiNi_{1/3}Co_{1/3}Mn_{1/3}O_2$, it is difficult to prevent cracks of active material particles with charge-discharge cycles because the positive active material contains different kinds of transition metals: Ni, Co and Mn, and has crystal anisotropy. FIGS. 3 and 4 show photographs of positive active material particles after initial charge and after 500 cycles, respectively, for a nonaqueous electrolyte secondary battery with the commercially available positive active material ($LiNi_{1/3}Co_{1/3}Mn_{1/3}O_2$) used in a positive electrode. It is apparent that in the latter positive active material, cracks occur in active material particles.

As described in Patent Documents 1 to 3, it is known that a lithium transition metal composite oxide in which a range of the full width at half maximum for a diffraction peak given by the (003) plane (hereinafter, referred to as "FWHM (003)") or the full width at half maximum for a diffraction peak given by the (104) (hereinafter, referred to as "FWHM (104)" is specified, or a range of the ratio of the full widths at half maximum (FWHM(003)/FWHM(104)) is specified is used in a positive active material to improve the power in a low SOC region, improve high rate discharge performance, improve high-voltage characteristics, and so on.

As described in Patent Document 4, it is known that when the full width at half maximum FWHM (104) for the diffraction peak at $2\theta=44.1\pm1°$ in a powder X-ray diffraction diagram is within a specific range for a positive active material containing a lithium transition metal composite oxide having an $\alpha$-$NaFeO_2$-type crystal structure, a non-aqueous electrolyte secondary battery (lithium secondary battery) having a high energy density and excellent charge-discharge cycle performance can be obtained. However, further improvement of charge-discharge cycle performance is required.

In addition, each of the FWHM (003) and FWHM (104) or the ratio FWHM (003)/FWHM (104) is measured after synthesis of the lithium transition metal composite oxide (before charge-discharge is performed), and a relationship between the ratio FWHM (003)/FWHM (104) and cracks of active material particles is not shown.

Patent Documents 5 and 6 disclose a positive active material in which fluorine, titanium, lithium phosphate or the like is localized on the surface. However, attention is not paid to the ratio FWHM (003)/FWHM (104) in the positive active material, and cracks of active material particles are not shown.

Patent Document 7 suggests that a lithium transition metal oxide is coated with LiF which is a coprecipitation reaction product of lithium nitrate and ammonium fluoride, and Patent Document 8 suggests that a lithium transition metal composite oxide (intermediate fired product) is treated with ammonium fluoride, and a transition metal coprecipitation precursor and lithium nitrate are mixed, and fired to obtain a lithium transition metal composite oxide (intermediate fired product).

Non-Patent Documents 2 to 4 suggest that LiF is mixed as a sintering aid in synthesis of a lithium transition metal composite oxide by sintering a coprecipitation precursor of a transition metal hydroxide and a lithium compound, and Patent Document 9 suggests that LiF is used in synthesis of a positive active material.

However, none of the above-mentioned documents pays attention to cracks, with charge-discharge cycles, of positive active material particles including a lithium transition metal composite oxide, and is intended to improve charge-discharge cycle performance.

Patent Document 10 suggests that the porosity of a positive active material is set within a specific range, but the range is wide, and improvement of charge-discharge cycle performance and the electrode packing density by reduction of the porosity of active material particles is not shown. In addition, specifically, it is merely suggested that the porosity is set to 3.6% in Example.

An object of the present invention is to provide a positive active material for a lithium secondary battery which is excellent in charge-discharge cycle performance, a method for producing a precursor of the positive active material, a method for producing the positive active material, and lithium secondary battery including a positive electrode containing the positive active material.

Means for Solving the Problems

A first aspect of the present invention is a positive active material for a lithium secondary battery which includes a lithium transition metal composite oxide which has an $\alpha$-$NaFeO_2$ structure, and has a diffraction peak at $2\theta=44\pm1°$ and a diffraction peak at $2\theta=18.6\pm1°$ in a powder X-ray diffraction diagram using a CuKα ray and in which in a ratio FWHM (003)/FWHM (104) of a full width at half maximum FWHM (003) for the diffraction peak at 2θ=18.6±1° to a full width at half maximum FWHM (104) for the diffraction peak at 2θ=44±1°, a ratio of FWHM (003)/FWHM (104) in a charge state immediately after a discharge state to FWHM (003)/FWHM (104) in the discharge state is 0.72 or more.

A second aspect of the present invention is a positive active material for a lithium secondary battery which includes a lithium transition metal composite oxide which has an α-NaFeO$_2$ structure and in which a full width at half maximum for a diffraction peak at 2θ=44±1° in a powder X-ray diffraction diagram using a CuKα ray is 0.125 to 0.145°, and a porosity is 1.5 to 3.5%.

A third aspect of the present invention is a positive active material for a lithium secondary battery which includes a lithium transition metal composite oxide which has an α-NaFeO$_2$ structure and in which in a crystallite size determined from a powder X-ray diffraction diagram using a CuKα ray, a reduction amount of the crystalline size in a charge state immediately after a discharge state with respect to the crystalline size in the discharge state is 20 nm or less.

A fourth aspect of the present invention is a method for producing a precursor to be used in production of the positive active material for a lithium secondary battery which includes a lithium transition metal composite oxide having an α-NaFeO$_2$ structure according to any one of the first to third aspects of the present invention, the method including precipitating a transition metal compound in a solution containing fluorine ions.

A fifth aspect of the present invention is a method for producing the positive active material for a lithium secondary battery which includes a lithium transition metal composite oxide having an α-NaFeO$_2$ structure according to any one of the first to third aspects of the present invention, the method including adding a sintering aid in the precursor produced by the method for producing a precursor according to the fourth aspect, and firing the mixture.

A sixth aspect of the present invention is a positive electrode for a lithium secondary battery which includes the positive active material for a lithium secondary battery according to any one of the first to third aspects of the present invention.

A seventh aspect of the present invention is a lithium secondary battery including a positive electrode containing the positive active material for a lithium secondary battery according to any one of the first to third aspects of the present invention, a negative electrode, and a nonaqueous electrolyte.

Advantages of the Invention

According to the present invention, there can be provided a positive active material for a lithium secondary battery which has improved charge-discharge cycle performance, a method for producing a precursor of the positive active material, a method for producing the positive active material, and lithium secondary battery including a positive electrode containing the positive active material, a negative electrode, and a nonaqueous electrolyte.

BEST MODE FOR CARRYING OUT THE INVENTION

Figure 1:
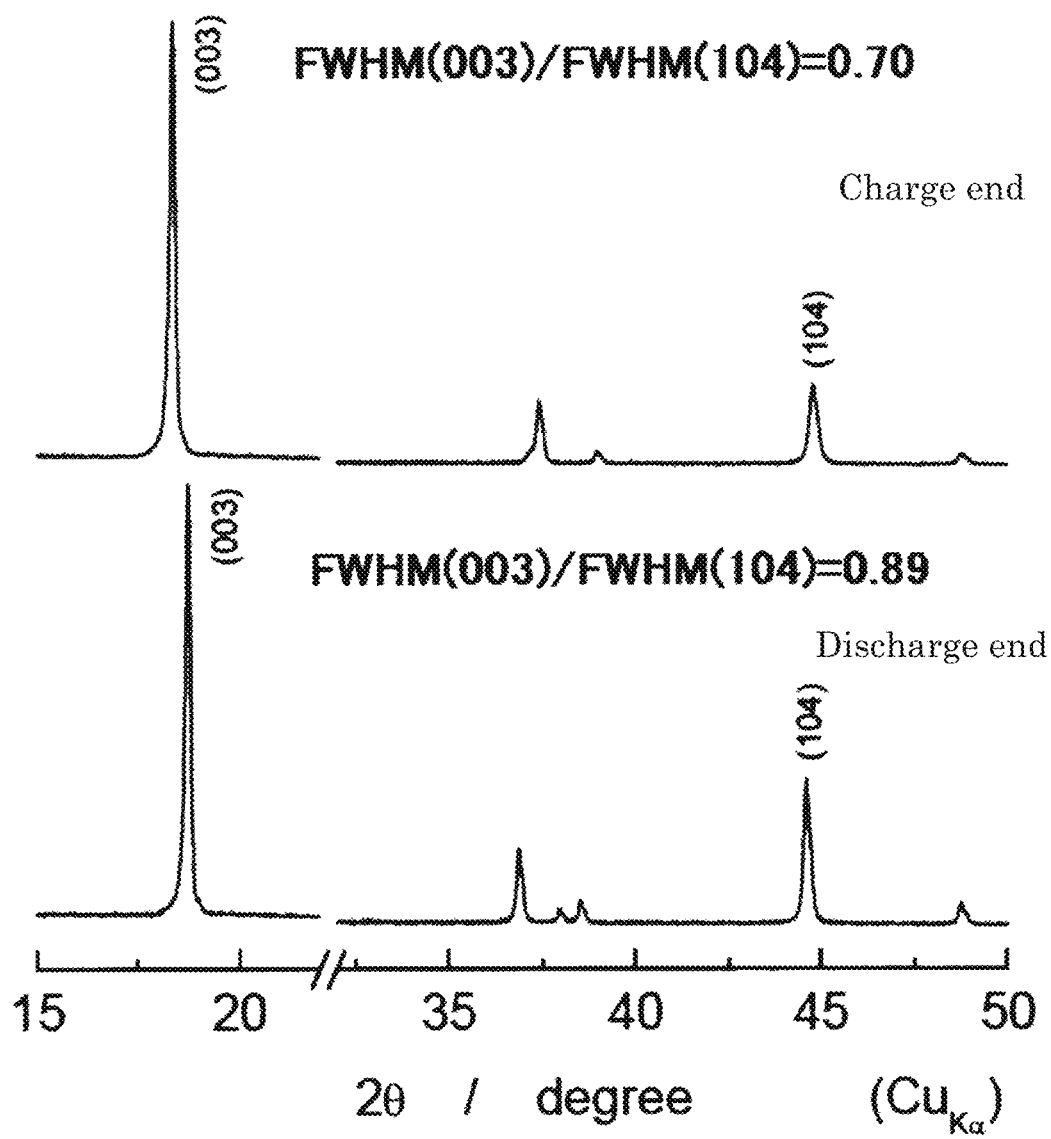
FIG. 1 is a powder X-ray diffraction diagram at a discharge end and a charge end for a positive active material in an example of a first embodiment.

The constitution and effect of the present invention will be described along with technical concepts. However, the effect mechanism includes estimations, and validity thereof does not limit the present invention. It is to be noted that the present invention can be implemented in various other forms without departing from its spirit or main features. Thus, the embodiments or examples described later are merely illustrative in all respects, and should not be construed to be restrictive. Further, all modifications and changes belonging to equivalents of claims fall within the scope of the present invention.

<Composition of Lithium Transition Metal Composite Oxide>

Preferably, a lithium transition metal composite oxide to be used for a positive active material for a lithium secondary battery according to each of embodiments of the present invention (first to third embodiments described later; hereinafter collectively referred to as "this embodiment") contains Ni and Mn, or Ni, Co and Mn as a transition metal element (Me). Typically, the lithium transition metal composite oxide is represented by the composition formula: Li$_{1+x}$Me$_{1-x}$O$_2$ (Me: transition metal including Ni, Co and Mn). For obtaining a lithium secondary battery having a high energy density, the molar ratio Li/Me of Li to the transition metal element Me, i.e. (1+x)/(1−x) is preferably 1.0 or more and 1.1 or less.

The lithium transition metal composite oxide for use in this embodiment is represented by, for example, the composition formula: Li(Ni$_a$Co$_b$Mn$_c$)O$_2$ (a+b+c=1).

In one embodiment of the present invention, the molar ratio Ni/Me of Ni to the transition metal element Me, i.e. a is more than 0, and preferably 0.3 or more and 0.6 or less for improving the charge-discharge cycle performance of a lithium secondary battery.

Co has an effect of enhancing the electron conductivity of active material particles and improving high rate discharge performance, but for reducing material costs, the molar ratio Co/Me of Co to the transition metal element Me, i.e. b is preferably 0.0 or more and 0.4 or less.

From the viewpoint of material costs and for improving charge-discharge cycle performance, the molar ratio Mn/Me of Mn to the transition metal element Me, i.e. c is more than 0, and preferably 0.2 or more and 0.5 or less.

Incidentally, the lithium transition metal composite oxide for use in this embodiment may contain a small amount of other metals such as alkali metals such as Na and K, alkaline earth metals such as Mg and Ca, and transition metals, typically 3d transition metals such as Fe and Zn as long as the effect of the present invention is not impaired.

<Crystal Structure of Lithium Transition Metal Composite Oxide>

The lithium transition metal composite oxide for use in this embodiment has an $\alpha$-NaFeO$_2$ structure. The lithium transition metal composite oxide after synthesis (before charge-discharge is performed) and after charge-discharge is attributed to R3-m. Properly speaking, "R3-m" is written with a bar "-" added above "3" of "R3m".

A lithium transition metal composite oxide to be used for a positive active material for a lithium secondary battery according to a first embodiment of the present invention has a diffraction peak attributed to the (104) plane at $2\theta=44\pm1°$ and a diffraction peak attributed to the (003) plane at $2\theta=18.6\pm1°$ when the space group R3-m is used as a crystal structure model on the basis of an X-ray diffraction pattern (using a CuK$\alpha$ ray source).

The ratio FWHM (003)/FWHM (104) of a full width at half maximum FWHM (003) for the diffraction peak at $2\theta=18.6\pm1°$ to a full width at half maximum FWHM (104) for the diffraction peak at $2\theta=44\pm1°$ is one index of anisotropy in the crystal structure of the lithium transition metal composite oxide.

The present inventor has prepared a lithium secondary battery using a lithium transition metal composite oxide for a positive active material, and examined a relationship between the ratio of the full width at half maximum FWHM (003)/FWHM (104) in the discharge state and the ratio of the full width at half maximum FWHM (003)/FWHM (104) in the charge state.

As a result, it has been found that when as in the case of the lithium transition metal composite oxide for use in the first embodiment, the ratio of FWHM (003)/FWHM (104) in the charge state immediately after the discharge state to FWHM (003)/FWHM (104) in the discharge state is 0.72 or more, i.e. the change in crystal anisotropy is within a specific range in transition from the initial discharge state to the subsequent charge state, progress of cracks of active material particles with charge-discharge cycles is remarkably suppressed to improve charge-discharge cycle performance.

In a lithium transition metal composite oxide to be used for a positive active material for a lithium secondary battery according to a second embodiment of the present invention, a full width at half maximum for a diffraction peak (diffraction peak at $2\theta=44\pm1°$) attributed to the (104) plane (hereinafter, referred to as "FWHM (104)") is 0.125 to 0.145° when the space group R3-m is used as a crystal structure model on the basis of an X-ray diffraction pattern (using a CuK$\alpha$ ray source). By using as a positive active material a lithium transition metal composite oxide in which the FWHM (104) is within the above-mentioned specific range, and the porosity is within a range of 1.5 to 3.5%, the porosity of active material particles can be reduced, and therefore the electrode packing density is improved, so that the capacity per volume is increased. In addition, by controlling crystallinity, a lithium secondary battery excellent in charge-discharge cycle performance can be obtained.

When the FWHM (104) is less than 0.125°, charge-discharge cycle performance is deteriorated even when the porosity is within a range of 1.5 to 3.5%. When the FWHM (104) is more than 0.145°, the porosity is accordingly more than 3.5%, so that charge-discharge cycle performance is deteriorated. When the porosity is more than 3.5%, charge-discharge cycle performance is deteriorated even when the FWHM (104) is within a range of 0.125 to 0.145°.

Therefore, in the lithium transition metal composite oxide for use in the second embodiment, the FWHM (104) is 0.125 to 0.145°, and the porosity is 1.5 to 3.5%.

The reason why when the full width at half maximum FWHM (104) and the porosity in the lithium transition metal composite oxide for use in the second embodiment are each within a specific range as described above, the charge-discharge cycle performance of the lithium secondary battery is improved may be as follows.

From a crystallographic point of view, the FWHM (104) is a parameter indicating stereoscopic crystallinity, and the larger the FWHM (104), the larger the lattice strain of the whole crystal. Therefore, a FWHM (104) of 0.125 to 0.145° may indicate the lattice strain of the crystal falls within a certain range.

A porosity of 1.5 to 3.5% may indicate that the pore volume in the active material particles falls within a certain range. When the porosity is less than 1.5%, an electrolyte solution hardly impregnated into the active material particles, and therefore favorable cycle performance cannot be obtained. In addition, when the porosity is more than 3.5%, the specific surface area of the active material particles is excessively high, and therefore a side reaction with the electrolyte solution is promoted particularly during charge, so that favorable cycle performance cannot be obtained.

Thus, in the second embodiment, it is thought that when the lattice strain of the crystal and the pore volume in the active material particles are each within a specific range, the effect of the present invention is exhibited.

In a lithium transition metal composite oxide to be used in a positive active material for a lithium secondary battery according to a third embodiment of the present invention, a reduction amount of a crystalline size in a charge state immediately after a discharge state with respect to a crystalline size in the discharge state is 20 nm or less with the crystallite size being determined from a powder X-ray diffraction diagram (using a CuK$\alpha$ ray source).

Generally, as a cause of cracks in particles of the active material or expansion of an electrode plate, a change in lattice volume with charge-discharge is known. However, it has been confirmed that in a lithium transition metal oxide such as LiNi$_{1/3}$Co$_{1/3}$Mn$_{1/3}$O$_2$, which is used as a positive active material and in which the ratio of Ni, Co and Mn is 1/1/1, little change in lattice volume with charge-discharge occurs (see Non-Patent Document 1).

Thus, the present inventor considered that a factor other than the "change in lattice volume with charge-discharge" exists as a cause of cracks in particles or expansion of the electrode plate, and examined and studied a relationship between various kinds of physical properties of the lithium transition metal composite oxide and charge-discharge cycle performance.

As a result, it has been found that in every lithium transition metal composite oxides, the crystallite size decreases in transition from the discharge state to the charge state, but in a lithium transition metal composite oxide with which an increase in DCR with charge-discharge cycles is suppressed and excellent charge-discharge performance is exhibited, the reduction amount of the crystallite size is small.

Figure 5:
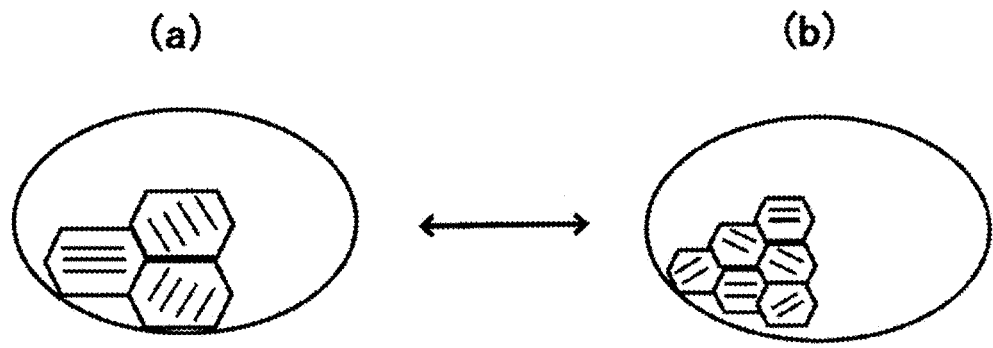
FIG. 5 show image diagrams showing a change in crystallite size with charge-discharge for lithium transition metal composite oxide particles in a conventional technique.

FIG. 5 show image diagrams showing a change in crystallite size with charge-discharge for lithium transition metal composite oxide particles in a conventional technique, where FIGS. 5(*a*) and 5(*b*) show a discharge state and a charge state, respectively. Each ellipse represents one secondary particle. The secondary particle has a particle size of, for example, about 10 μm. The pentagon in the ellipse represents a crystallite that forms each secondary particle. The size of the crystallite is, for example, 50 to 200 μm in the discharge state (a). The whole secondary particle is formed by an assembly of crystallites, but here, the crystallites are partially depicted. The parallel lines drawn in the pentagon show a state in which each crystallite includes layers, and the spacing between the parallel lines schematically shows that the layers have a fixed interlayer distance. When charge-discharge is performed with a lithium transition metal composite oxide used as a positive active material, the crystallite size of the crystallite in the charge state (b) decreases as compared to the crystallite size of the crystallite in the discharge state (a) while the interlayer distance is unchanged as shown in the image diagrams of FIG. 5. Here, it is presumed that when the degree of decrease in crystallite size with charge is excessively large, the frequency of appearance of portions in which arrangement of lattices between crystallites is discontinuous increases, so that cracks are easily generated between crystallites, and thus DCR easily increases. When charge-discharge is performed with a lithium transition metal composite oxide used as a positive active material, the crystallite size decreases while the interlayer distance in the crystal is unchanged as shown in the image diagrams of FIG. 5. It is presumed that when the degree of decrease in crystallite size with charge is excessively large, the frequency of appearance of portions in which arrangement of lattices between crystallites is discontinuous increases, so that cracks are easily generated between crystallites, and thus DCR easily increases. When the reduction amount of the crystalline size in the charge state immediately after discharge with respect to the crystalline size in the discharge state is 20 nm or less as in the lithium transition metal composite oxide for use in the third embodiment, an increase in DCR with charge-discharge cycles is suppressed to improve charge-discharge cycle performance.

Incidentally, it is preferable that the structure of the lithium transition metal composite oxide for use in this embodiment do not change during charge. This can be confirmed when the lithium transition metal composite oxide is observed as a single phase attributed to the space group R3-m on an X-ray diffraction diagram in electrochemical oxidation to a potential of 5.0 V (vs. Li/Li$^+$). Accordingly, lithium secondary battery excellent in charge-discharge cycle performance can be obtained.

Further, in the lithium transition metal composite oxide for use in this embodiment, an oxygen position parameter determined by crystal structure analysis by a Rietveld method on the basis of an X-ray diffraction pattern is preferably 0.262 or less at the discharge end and 0.267 or more at the charge end. Accordingly, lithium secondary battery excellent in high rate discharge performance can be obtained. The oxygen position parameter is a value of z when the spatial coordinates of Me (transition metal) are defined as (0, 0, 0), the spatial coordinates of Li (lithium) are defined as (0, 0, 1/2), and the spatial coordinates of 0 (oxygen) are defined as (0, 0, z) for the α-NaFeO$_2$-type crystal structure of the lithium transition metal composite oxide attributed to the spatial group R3-m. That is, the oxygen position parameter is a relative index indicating how far the 0 (oxygen) position is from the Me (transition metal) position.

<Method for Producing Precursor of Lithium Transition Metal Composite Oxide>

A method for producing a precursor of a lithium transition metal composite oxide to be used for an active material for a lithium secondary battery according to this embodiment (the above-described first to third embodiments) will now be described.

The lithium transition metal composite oxide for use in this embodiment can be obtained essentially by preparing a raw material containing metal elements (Li, Ni, Co and Mn), which form the active material, in accordance with a desired composition of the active material (oxide), and firing the prepared raw material. For the amount of the Li raw material, however, it is preferable to incorporate the Li raw material in an excessive amount by about 1 to 5% in consideration of elimination of a part thereof during firing.

In preparation of a composite oxide having a desired composition, so-called a "solid phase method" in which salts of Li, Ni, Co and Mn are mixed and fired, and so-called a "coprecipitation method" in which a coprecipitation precursor with Ni, Co and Mn existing in one particle is prepared beforehand, and a Li salt is mixed thereto, and the mixture is fired are known. In the synthesis process of the "solid phase method", particularly Mn is hard to be uniformly dissolved with Ni and Co, and therefore it is difficult to obtain a sample in which the elements are uniformly distributed in one particle. So far, in documents and so on, many attempts have been made to dissolve Mn with a part of Ni or Co (LiNi$_{1-x}$Mn$_x$O$_2$ etc.) by the solid phase method, but by selecting the "coprecipitation method", a uniform phase is more easily obtained at an atomic level. Thus, in Examples described later, the "coprecipitation method" is employed.

In the method for producing a precursor of a lithium transition metal composite oxide for use in this embodiment, it is preferable that a raw material aqueous solution containing Ni, Co and Mn be added dropwise, and a compound containing Ni, Co and Mn be coprecipitated in the solution to prepare a precursor.

In preparation of a coprecipitation precursor, Mn is most easily oxidized among Ni, Co and Mn, so that it is not easy to prepare a coprecipitation precursor in which Ni, Co and Mn are homogeneously distributed in a divalent state, and therefore homogeneous mixing of Ni, Co and Mn at an atomic level tends to be insufficient. Therefore, in the present invention, it is preferable to remove dissolved oxygen for suppressing oxidation of Mn distributed in the coprecipitation precursor. Examples of the method for removing dissolved oxygen include a method in which a gas containing no oxygen is bubbled. The gas containing no oxygen is not limited, but a nitrogen gas, an argon gas, carbon dioxide (CO$_2$) or the like can be used.

pH in the step of preparing a precursor by coprecipitating a compound containing Ni, Co and Mn in a solution is not limited, but can be set at 10.5 to 14 when the coprecipitation precursor is to be prepared as a coprecipitation hydroxide precursor. Here, it is preferable to control pH for increasing the tap density of the precursor. When the pH is 11.5 or less, it can be ensured that the tap density of the precursor is 1.00 g/cm$^3$ or more, so that high rate discharge performance can be improved. Further, when the pH is 11.0 or less, the particle growth rate can be accelerated, so that the stirring duration after completion of dropwise addition of a raw material aqueous solution can be reduced.

In addition, when the coprecipitation precursor is to be prepared as a coprecipitation carbonate precursor, the pH may be 7.5 to 11. Here, when the pH is 9.4 or less, it can be ensured that the tap density of the precursor is 1.25 g/cc or more, so that high rate discharge performance can be improved. Further, when the pH is 8.0 or less, the particle growth rate can be accelerated, so that the stirring duration after completion of dropwise addition of a raw material aqueous solution can be reduced.

Examples of the raw material of the coprecipitation precursor may include nickel hydroxide, nickel carbonate, nickel sulfate, nickel nitrate and nickel acetate for the Ni compound, cobalt sulfate, cobalt nitrate and cobalt acetate for the Co compound, and manganese oxide, manganese carbonate, manganese sulfate, manganese nitrate and manganese acetate for the Mn compound.

The rate of dropwise addition of the raw material aqueous solution significantly influences homogeneity of the element distribution within one particle of the precipitation precursor generated. For the preferred dropwise addition rate, it depends on the size of the reaction tank, stirring conditions, pH, the reaction temperature and so on, but is preferably 30 ml/min or less. For increasing the discharge capacity, the dropwise addition rate is more preferably 10 ml/min or less, most preferably 5 ml/min or less.

When a complexing agent such as $NH_3$ is present in the reaction tank, and certain convection conditions are applied, rotation and revolution, in a stirring tank, of particles are promoted by further continuing stirring after completion of dropwise addition of the raw material aqueous solution, and in this process, particles are grown stepwise into a concentric circular sphere while colliding with one another. That is, coprecipitation precursor is formed through reactions in two stages, i.e. a metal complex formation reaction when the raw material aqueous solution is added dropwise into the reaction tank and a precipitate formation reaction that occurs during retention of the metal complex in the reaction tank. Therefore, by appropriately selecting a time during which stirring is further continued after completion of dropwise addition of the raw material aqueous solution, a coprecipitation precursor having a desired particle size can be obtained.

For the preferred time during which stirring is continued after completion of dropwise addition of the raw material aqueous solution, it depends on the size of the reaction tank, stirring conditions, pH, the reaction temperature and so on, but is, for example, preferably 0.5 h or more, more preferably 1 h or more for growing particles as uniform spherical particles. For reducing the possibility that the particle size is so large that the power performance of the battery in the low-SOC region is not sufficient, the time is preferably 30 h or less, more preferably 25 h or less, most preferably 20 h or less.

The feature of the production method according to this embodiment lies in existence of fluorine ions in a reaction solution in preparation of a precursor (coprecipitation precursor) as described above. Preferably, ammonium ions further exist in the reaction solution. In a conventional technique, ammonium ions are used as a neutralizing agent also serving as a complexing agent (chelating agent), but in the present invention, fluoride ions and ammonium ions exist at the same time, so that a dense precursor can be prepared due to the effect of ammonium ions as a chelating agent, and fluorine can be made to exist inside the precursor due to existence of fluoride ions. As a method for ensuring that fluoride ions and ammonium ions exist at the same time, ammonium fluoride may be added, or respective compounds such as ammonium chloride and sodium fluoride may be added. Here, it is preferable that the amount of fluorine ions in the reaction solution be not excessively large. When ammonium fluoride is added, the concentration of ammonium fluoride in a reaction layer is preferably 0.1 to 0.3 mol/L. Accordingly, the amount of fluorine in the precursor is not excessive, and therefore it is possible to reduce the risk of hindering a process in which molten lithium hydride enters the inside of the precursor and is diffused during firing.

<Method for Producing Lithium Transition Metal Composite Oxide>

Preferably, the method for producing an active material for a lithium secondary battery according to this embodiment includes a method in which the coprecipitation precursor and a Li compound are mixed, a sintering aid is then added, and the mixture is fired.

When a precursor obtained with fluorine ions existing in a coprecipitation reaction solution in the manner described above is fired in the presence of a sintering aid such as LiF, a more remarkable effect is exhibited. Accordingly, in the first embodiment, it is possible to obtain a positive active material in which the ratio of FWHM (003)/FWHM (104) in the charge state immediately after the discharge state to FWHM (003)/FWHM (104) in the discharge state is 0.72 or more, and cracks of particles with charge-discharge cycles are suppressed. In addition, in the second embodiment, it is possible to obtain a positive active material having a FWHM (104) of 0.125 to 0.145° and a porosity of 1.5 to 3.5%, and it is possible to increase the electrode density while controlling the crystallinity. Further, in the third embodiment, the reduction amount of the crystalline size in the charge state immediately after the discharge state with respect to the crystalline size in the discharge state can be set to 20 nm or less, so that an increase in DCR with charge-discharge cycles can be suppressed.

The effect mechanism thereof is not evident, but is presumed as follows. When merely a sintering aid such as LiF is applied during firing, precursor particles merely come into contact with the sintering aid in a solid phase, and therefore the effect of the sintering aid is exerted only on the surfaces of active material particles. On the other hand, it is presumed that in this embodiment, fluorine exists in the stage of forming a precursor from the solution, so that fluorine can be made to exist inside the precursor particles, and therefore the sintering effect is more effectively exhibited to suppress progress of crystal anisotropy of the active material particles with the charge-discharge cycles.

It is preferable to use LiF, Lie, $SO_4$ or $Li_3PO_4$ as a sintering aid together with lithium hydroxide or lithium carbonate that is commonly used as a Li compound. The addition ratio of these sintering aids is preferably 1 to 10 mol % based on the total amount of the Li compounds. For the total amount of the Li compounds, it is preferable to incorporate the Li compounds in an excessive amount by about 1 to 5% in consideration of elimination of a part thereof during firing. The lithium transition metal composite oxide produced using these sintering aids includes a F, S or P element on the surfaces of particles. It can be confirmed by energy dispersion type X-ray analysis (EDX) that the lithium transition metal composite oxide includes a F, S or P element on the surfaces of particles.

The firing temperature affects the reversible capacity of the active material.

When the firing temperature is excessively low, the crystallization does not sufficiently proceed, and thus electrode performance tends to be deteriorated. In one aspect of the present invention, the firing temperature is preferably 900° C. or higher. In the first embodiment, the firing temperature is 900° C. or higher, so that it is possible to obtain active material particles which has a high sintering degree and in which the ratio of FWHM (003)/FWHM (104) in the charge state immediately after the discharge state to FWHM (003)/FWHM (104) in the discharge state is 0.72 or more, and it is possible to improve charge-discharge cycle performance. In the second embodiment, the firing temperature is 900° C. or higher, so that the full width at half maximum FWHM (104) for the diffraction peak of the active material can be set to 0.145° or less, so that charge-discharge cycle performance can be improved. In the third embodiment, the firing temperature is 900° C. or higher, so that the reduction amount of the crystalline size in the charge state immediately after the discharge state with respect to the crystalline size in the discharge state can be set to 20 nm or less, so that an increase in DCR with charge-discharge cycles can be suppressed.

In addition, the inventors have minutely analyzed the full width at half maximum for the diffraction peak of the active material according to this embodiment, and thus found that in a sample synthesized at a temperature lower than 750° C., strain remains in a lattice, and when the sample is synthesized at a higher temperature, strain can be almost eliminated. In addition, the size of the crystallite increases in proportion with an increase in synthesis temperature. Accordingly, in the composition of the active material according to this embodiment, a favorable discharge capacity is achieved by trying to obtain particles having little lattice strain in the system and having a sufficiently grown crystallite size. Specifically, it has been found that it is preferable to employ a synthesis temperature (firing temperature) and Li/Me ratio composition such that the amount of strain affecting the lattice constant is 2% or less, and the crystallite size is grown to 50 nm or more. When charge-discharge of an electrode obtained by using such an active material is performed, there is a change due to expansion and shrinkage, but it is preferable that the crystallite size be kept 30 nm or more even in the charge-discharge process.

On the other hand, when the firing temperature is excessively high, the structure is changed from a layered α-NaFeO$_2$ structure to a rock salt type cubic crystal structure, which is disadvantageous for movement of lithium ions in the active material during a charge-discharge reaction, resulting in deterioration of discharge performance. In this embodiment, the firing temperature is preferably 1000° C. or lower. When the firing temperature is 1000° C. or lower, the full width at half maximum FWHM (104) for the diffraction peak of the active material according to this embodiment can be set to 0.125° or more, so that charge-discharge cycle performance can be improved.

Therefore, when the positive active material containing a lithium transition metal composite oxide according to this embodiment is prepared, the firing temperature is preferably 900 to 1000° C. for improving charge-discharge cycle performance.

<Negative Electrode Material>

The negative electrode material is not limited, and any material may be selected as long as it is in a form capable of releasing or absorbing lithium ions. Examples thereof include a titanium-based materials such as lithium titanate having a spinel-type crystal structure, typically Li [Li$_{1/3}$Ti$_{5/3}$]O$_4$; alloy based materials based on Si, Sb, Sn and the like; lithium metals; lithium alloys (lithium metal-containing alloys such as lithium-silicon, lithium-aluminum, lithium-lead, lithium-tin, lithium-aluminum-tin, lithium-gallium and wood alloy); lithium composite oxides (lithium-titanium); silicon oxide; alloys capable of absorbing and releasing lithium; and carbon materials (e.g. graphite, hard carbon, low-temperature fired carbon and amorphous carbon).

<Positive Electrode/Negative Electrode>

Preferably, the powder of the positive active material and the powder of the negative electrode material have an average particle size (D50) of 100 lam or less. In particular, the powder of the positive active material is preferably 50 μm or less for improving high power performance of a nonaqueous electrolyte battery, and preferably 3 μm or more for maintaining charge-discharge cycle performance. For obtaining the powder in a predetermined shape, a grinder or a classifier is used. For example, a mortar, a ball mill, a sand mill, a vibrating ball mill, a planetary ball mill, a jet mill, a counter jet mill, a swirling air jet-type jet mill, a sieve or the like is used. In grinding, wet grinding in which water or an organic solvent such as hexane coexists can be applied. The classification method is not particularly limited, and a sieve, a wind force classifier or the like is used as necessary in both dry and wet processes.

While the positive active material and the negative electrode material which are main components of the positive electrode and the negative electrode have been described in detail above, the positive electrode and the negative electrode may contain a conductive agent, a binding agent, a thickener, a filler and so on in addition to the above-mentioned main components.

The conductive agent is not limited as long as it is an electron conductive material which does not adversely affect battery performance, and normally, conductive materials such as natural graphite (scaly graphite, scalelike graphite, earthy graphite and the like), artificial graphite, carbon black, acetylene black, ketjen black, carbon whiskers, carbon fibers, powders of metals (copper, nickel, aluminum, silver, gold and the like), metal fibers, and conductive ceramic materials such as conductive ceramics can be included alone or as a mixture thereof.

Among them, acetylene black is preferable as the conductive agent from the viewpoint of electron conductivity and coatability. The addition amount of the conductive agent is preferably 0.1% by weight to 50% by weight, especially preferably 0.5% by weight to 30% by weight based on the total weight of the positive electrode or the negative electrode. In particular, it is preferable that acetylene black be ground into ultrafine particles of 0.1 to 0.5 μm in size because the necessary amount of carbon can be reduced. These mixing methods are physical mixing methods, and uniform mixing is preferable. Thus, mixing can be performed in a dry process or a wet process using a powder mixer such as a V-shape mixer, an S-shape mixer, a Raikai mixer, a ball mill or a planetary ball mill.

As the binding agent, normally one of thermoplastic resins such as polytetrafluoroethylene (PTFE), polyvinylidene fluoride (PVDF), polyethylene and polypropylene; and polymers having rubber elasticity, such as ethylene-propylene-diene terpolymer (EPDM), sulfonated EPDM, styrene butadiene rubber (SBR) and fluorine rubber, or a mixture of two or more thereof can be used. The addition amount of the binding agent is preferably 1 to 50% by weight, especially preferably 2 to 30% by weight based on the total weight of the positive electrode or the negative electrode.

Any filler may be used as long as it does not adversely affect battery performance. Normally, an olefin-based polymer such as polypropylene or polyethylene, amorphous silica, alumina, zeolite, glass, carbon or the like is used. The addition amount of the filler is preferably 30% by weight or less based on the total weight of the positive electrode or the negative electrode.

The positive electrode and the negative electrode are suitably prepared by kneading the above-mentioned main components (a positive active material in the positive electrode and a negative electrode material in the negative electrode) and other materials to obtain a mixture, mixing the mixture with an organic solvent such as N-methylpyrrolidone or toluene, or water, then applying or pressure-bonding the resulting mixture onto a current collector as described in detail below, and performing a heating treatment at about 50° C. or 250° C. for about 2 hours. For the method for applying the mixture, it is preferable to apply the mixture in any thickness and in any shape using means such as roller coating with an applicator roll or the like, screen coating, a doctor blade method, spin coating or a bar coater, but the method is not limited thereto.

As the current collector, a current collecting foil such as an Al foil or a Cu foil can be used. The current collecting foil of the positive electrode is preferably an Al foil, and the current collecting foil of the negative electrode is preferably a Cu foil. The thickness of the current collecting foil is preferably 10 to 30 μm. In addition, the thickness of the composite layer is preferably 40 to 150 μm (excluding the thickness of the current collecting foil) after pressing.

<Nonaqueous Electrolyte>

The nonaqueous electrolyte to be used in the lithium secondary battery including a positive electrode containing the positive active material according to this embodiment is not limited, and a nonaqueous electrolyte that is generally proposed to be used in a lithium battery or the like can be used. Examples of the nonaqueous solvent to be used for the nonaqueous electrolyte include, but are not limited to, cyclic carbonic acid esters such as propylene carbonate, ethylene carbonate, butylene carbonate, chloroethylene carbonate and vinylene carbonate; cyclic esters such as γ-butyrolactone and γ-valerolactone; chain carbonates such as dimethyl carbonate, diethyl carbonate and ethyl methyl carbonate; chain esters such as methyl formate, methyl acetate and methyl butyrate; tetrahydrofuran or a derivatives thereof; ethers such as 1,3-dioxane, 1,4-dioxane, 1,2-dimethoxy ethane, 1,4-dibutoxyethane and methyl diglyme; nitriles such as acetonitrile and benzonitrile; and dioxolane or derivatives thereof. These compounds are used singly, or in mixture of two or more thereof.

When a positive electrode containing the positive active material according to this embodiment is combined with a nonaqueous electrolyte containing propylene carbonate, the capacity recovery rate is improved to obtain a lithium secondary battery superior in storage life performance as compared to a case where a nonaqueous electrolyte which does not contain propylene carbonate is used. Even when a nonaqueous electrolyte containing propylene carbonate is used, the capacity recovery rate is not improved when the positive electrode does not contain the positive active material according to this embodiment. The content of propylene carbonate is preferably less than 10% by volume, more preferably 5% by volume or less. By using a nonaqueous electrolyte containing propylene carbonate in an amount of less than 10% by volume, the capacity recovery rate is improved, and the resistance increase rate is suppressed.

The following additives may be added to the above-mentioned nonaqueous electrolyte. The additives include vinylidene carbonate; sulfur-containing compounds such as ethylene sulfide, 1,3-propenesultone, diglycol sulfate, 1,3-propanesultone (PS), 1,4-butanesultone, 2,4-butanesultone, sulfolane, ethylene glycol cyclic sulfate, and propylene glycol cyclic sulfate; phosphorus-containing compounds such as lithium difluorophosphate; and cyan-based compounds such as adiponitrile and succilonitrile. The addition amount of these compounds in the nonaqueous electrolyte is preferably from 0.5 to 2% by mass.

Examples of the electrolyte salt to be used for the nonaqueous electrolyte include inorganic ionic salts containing one of lithium (Li), sodium (Na) and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$ and KSCN; and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_6)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate and lithium dodecylbenzenesulfonate. These ionic compounds can be used singly, or in combination of two or more thereof.

Further, use of a mixture of $LiPF_6$ or $LiBF_4$ with a lithium salt having a perfluoroalkyl group, such as $LiN(C_2F_5SO_2)_2$ is more preferable because the viscosity of the electrolyte can be further reduced, so that low-temperature performance can be further improved, and self-discharge can be suppressed.

In addition, a normal-temperature molten salt or an ionic liquid may be used as the nonaqueous electrolyte.

The concentration of the electrolyte salt in the nonaqueous electrolyte is preferably 0.1 mol/L to 5 mol/L, more preferably 0.5 mol/L to 2.5 mol/L for reliably obtaining a nonaqueous electrolyte battery having high battery performance.

<Separator>

As the separator to be used for a lithium secondary battery including a positive electrode containing the positive active material according to this embodiment, it is preferable that a porous film, a nonwoven fabric and the like having excellent high rate discharge performance be used singly or in combination. Examples of the material that forms the separator for a nonaqueous electrolyte battery may include polyolefin-based resins, typically polyethylene, polypropylene and the like; polyester-based resins, typically polyethylene terephthalate, polybutylene terephthalate and the like; polyvinylidene fluoride; vinylidene fluoride-hexafluoroethylene copolymers; vinylidene fluoride-perfluorovinyl ether copolymers; vinylidene fluoride-tetrafluoroethylene copolymers; vinylidene fluoride-trifluoroethylene copolymers; vinylidene fluoride-fluoroethylene copolymers; vinylidene fluoride-hexafluoroacetone copolymers; vinylidene fluoride-ethylene copolymers; vinylidene fluoride-propylene copolymers; vinylidene fluoride-trifluoropropylene copolymers; vinylidene fluoride-tetrafluoroethylene-hexafluoropropylene copolymers; and vinylidene fluoride-ethylene-tetrafluoroethylene copolymer.

The porosity of the separator is preferably 98% by volume or less from the viewpoint of strength. From the viewpoint of charge-discharge performance, the porosity is preferably 20% by volume or more.

For the separator, a polymer gel including a polymer such as acrylonitrile, ethylene oxide, propylene oxide, methyl methacrylate, vinyl acetate, vinyl pyrrolidone, and polyvinylidene fluoride and an electrolyte may be used. Use of the nonaqueous electrolyte in a gel state as described above is preferable because an effect of preventing liquid leakage is exhibited.

Further, use of the above-mentioned porous film or nonwoven fabric and polymer gel in combination as the separator is preferable because the liquid retainability of the electrolyte is improved. Specifically, a film in which a surface of a polyethylene microporous film and microporous wall surfaces are covered with a solvent-philic polymer having a thickness of several µm or less is formed, and an electrolyte is held in the micropores of the film, so that the solvent-philic polymer is gelled.

Examples of the solvent-philic polymer include polyvinylidene fluoride, and polymers in which an acrylate monomer having an ethylene oxide group, an ester group or the like, an epoxy monomer, a monomer having an isocyanate group, or the like is crosslinked. The monomer can be subjected to a crosslinking reaction by heating the polymer, or by using an ultraviolet (UV) ray, or active light such as an electron beam (EB), or the like in combination with a radical initiator.

Other constituent elements of the battery include a terminal, an insulating plate and a battery case, and those which have been heretofore used may be used as they are.

<Lithium Secondary Battery>

Figure 6:
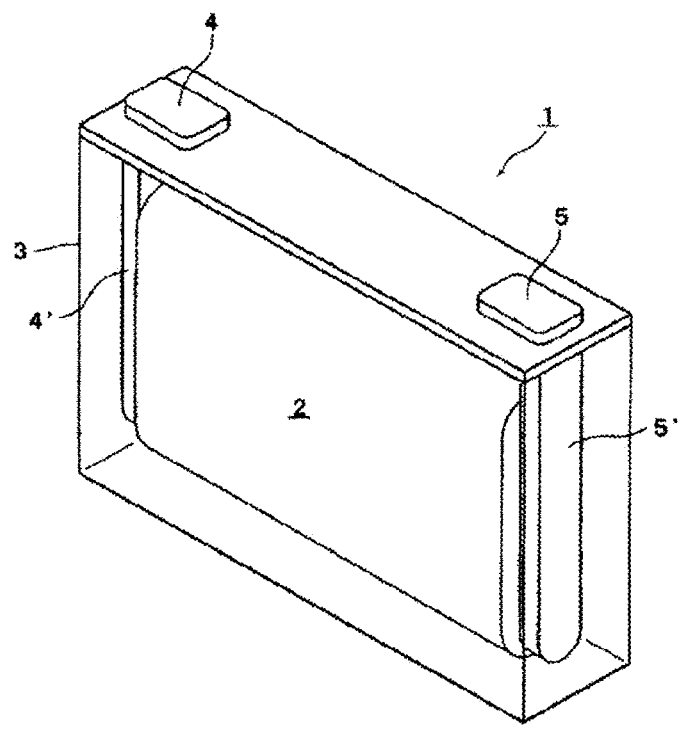
FIG. 6 is a perspective view showing a lithium secondary battery according to one aspect of the present invention.

FIG. 6 shows a lithium secondary battery including a positive electrode containing the positive active material according to this embodiment. FIG. 6 is a perspective view showing the inside of a container of a rectangular lithium secondary battery in a perspective manner. A lithium secondary battery 1 is assembled by injecting a nonaqueous electrolyte (electrolyte solution) into a battery container 3 containing an electrode group 2. The electrode group 2 is formed by winding a positive electrode and a negative electrode with a separator interposed therebetween, the positive electrode including a positive active material, the negative electrode including a negative active material. The positive electrode is electrically connected to a positive electrode terminal 4 through a positive electrode lead 4', and the negative electrode is electrically connected to a negative electrode terminal 5 through a negative electrode lead 5'.

The shape of the lithium secondary battery according to this embodiment is not particularly limited, and examples of the lithium secondary battery include cylindrical batteries, prismatic batteries (rectangular batteries) and flat batteries.

Figure 7:
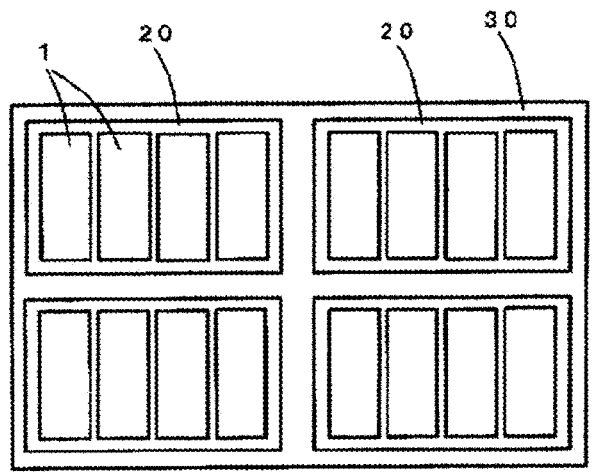
FIG. 7 is a schematic view showing an energy storage apparatus including a plurality of lithium secondary batteries according to one aspect of the present invention.

As one aspect, the present invention can also be implemented as an energy storage apparatus in which a plurality of the foregoing lithium secondary batteries are assembled. One example of the energy storage apparatus is shown in FIG. 7. In FIG. 7, an energy storage apparatus 30 includes a plurality of energy storage units 20. Each of the energy storage units 20 includes a plurality of the lithium secondary batteries 1. The energy storage apparatus 30 can be mounted as a power source for an automobile such as an electric vehicle (EV), a hybrid vehicle (HEV), and a plug-in hybrid vehicle (PHEV).

Methods for measurement of various items for the positive active material for a lithium secondary battery will now be described.

<Measurement Target>

When the positive active material is a measurement target, the positive active material as a measurement target is subjected to measurement as it is when the positive active material is in the form of a powder before preparation of an electrode.

When the lithium secondary battery is disassembled to take out the positive electrode, before disassembling the battery, the battery is discharged in accordance with the following procedure. First, constant current constant voltage charge is performed. The charge current is 0.1 C. The charge voltage is a voltage at which the potential of the positive electrode is supposed to be 4.3 V (vs. Li/Li$^+$). As an end-of-charge condition, charge is performed until the current value decreases to 0.01 C. After a quiescent period of 30 minutes, constant current discharge is performed. The discharge current is 0.1 C. The end-of-discharge voltage is a voltage at which the potential of the positive electrode is supposed to be 2.0 V (vs. Li/Li$^+$). When the battery is a lithium secondary battery with a metal lithium electrode used as a negative electrode, the battery is brought into a discharge state in accordance with the above-described procedure. After the discharge, the battery is left standing for 1 h or more, and then disassembled in a dry atmosphere at a dew point of −50° C. or lower, and the positive electrode is taken out. When the battery is not a lithium secondary battery with a metal lithium electrode used as a negative electrode, the positive electrode that has been taken out is cut to a sufficiently small area of about 1 to 4 cm$^2$ to obtain a working electrode for accurately controlling the positive electrode potential. Using the working electrode and a counter electrode of metal lithium, a test cell is formed. For this test cell, constant current constant voltage charge and constant current discharge are performed again in accordance with the above-described conditions and procedure. When the battery is not a lithium secondary battery with a metal lithium electrode used as a negative electrode, the battery is brought into a discharge state in accordance with the above-described procedure. The operation until measurement from disassembly of the test cell is carried out in an argon atmosphere at a dew point of −60° C. or lower. The test electrode which has been taken out is thoroughly washed off a adhered nonaqueous electrolyte using dimethyl carbonate, and dried overnight at room temperature. The current collector is further removed from the test electrode to collect a positive composite, and the aggregated state is loosened using an agate mortar. When the positive composite is a measurement target, the positive composite is subjected to measurement.

When the positive active material is further taken out from the collected positive composite, the positive composite is heat-treated in air at 600° C. for 4 hours by a small electric furnace to remove carbon as a conductive agent and a PVdF binder as a binding agent. When the positive active material contained in the positive electrode for a lithium secondary battery is a measurement target, the positive active material is subjected to measurement.

<Method for Confirming Existence of F, S or P Used for Sintering Aid>

It is confirmed by energy dispersion type X-ray analysis (EDX) that the lithium transition metal composite oxide includes F, S or P on the surfaces of particles thereof.

An electrolyte salt or additive to be used for the nonaqueous electrolyte may contain F, S or P, and F, S or P derived therefrom may be caught in a film formed on the surfaces of positive active material particles. However, F, S or P derived from the nonaqueous electrolyte is removed by washing the lithium secondary battery with dimethyl carbonate in accordance with the above-described procedure as long as it is not a lithium secondary battery repeatedly subjected to an extremely large number of charge-discharge cycles.

The energy dispersion type X-ray analysis (EDX) is an analysis method in which a scanning electron microscope (SEM) image is captured, and the amounts of elements on a sample surface are determined. As a SEM apparatus, Hitachi Desktop Microscope™ 3030 Plus Miniscope is used. As an EDX analyzer, EDX System (model: Quantax 70 manufactured by Bruker nano GmbH) for Hitachi Desktop Microscope™ 3030 Plus Miniscope is used.

In this measurement, the positive active material is measurement target. A measurement sample is subjected to a Pd and Pt sputtering treatment beforehand, and set in the SEM apparatus. In the SEM apparatus, the acceleration voltage is set to 5.0 kV, and the observation condition is set to the "secondary electron" in the first place. Adjustment of the focus and contrast starts at a magnification of 10000 times, and when adjustment at a magnification of 1000 times is completed, the acceleration voltage is changed to 15.0 kV, and the observation condition is changed to the "reflected electron" for enhancing the element detection intensity. In the SEM image captured by the EDX apparatus, the positions and diameters of spots on the SEM image are adjusted after completion of integration processing for 180 sec, and analysis of the spectrum of a F, S or P element in the spots and determination of the amount of the element are performed.

<Measurement of Particle Size Distribution and D50>

In this measurement, the positive active material is measurement target. As a measuring apparatus, Microtrac (model: MT 3000) manufactured by Nikkiso Co., Ltd. is used. The measuring apparatus includes an optical stand, a sample supply unit, and a computer including control software, and a wet cell having a laser light transmission window is installed on the optical stand. The measurement principle is based on a method in which laser light is radiated to a wet cell through which a dispersion liquid with a measurement target sample dispersed in a dispersion solvent is circulated, and a distribution of scattered light from the measurement sample is converted to a particle size distribution. The dispersion liquid is stored in the sample supply unit, and circulatingly supplied to the wet cell by a pump. Ultrasonic vibrations are always applied to the sample supply unit. Water is used as the dispersion solvent. Microtrac DHS for Win 98 (MT 3000) is used as measurement control software. For "substance information" set and input in the measuring apparatus, "refractive index" of the solvent is set to 1.33, "transmission (TRANSPARENT)" is selected as "transparency", and "nonspherical" is selected as "spherical particle". Prior to measurement of the sample, the "Set Zero" operation is carried out. The "Set Zero" operation is an operation for eliminating influences of external disturbance factors (glass, contaminations of a glass wall surface, glass irregularities and the like) other than scattered light from particles on subsequent measurement. In this operation, only water as a dispersion solvent is added in the sample supply unit, background measurement is performed while only water as a dispersion solvent is circulated through the wet cell, and background data is stored in the computer. Subsequently, the "Sample LD (Sample Loading)" operation is carried out. The "Sample LD" operation is an operation for optimizing the concentration of a sample in a dispersion liquid to be circulatingly supplied to the wet cell during measurement. In this operation, the measurement target sample is manually added in the sample supply unit to an optimum amount in accordance with instructions from measurement control software. Subsequently, the "measurement" button is depressed to perform the measurement operation. The measurement operation is repeated twice, and a measurement result is output as an average value of the measurements from the control computer. The measurement result is acquired as a particle size distribution histogram. The value of a particle size at which the cumulative volume in the particle size distribution of the secondary particles is 50% is acquired as D50.

<X-Ray Diffraction Measurement and Measurement of Full Width at Half Maximum>

In the specification of the present application, X-ray diffraction measurement and measurement of the full width at half maximum using the X-ray diffraction measurement are performed under the following conditions. The ray source is CuKα, the acceleration voltage is 30 kV, and the acceleration current is 15 mA. The sampling width is 0.01 deg, the scanning time is 14 minutes (scanning speed is 5.0), the divergence slit width is 0.625 deg, the light receiving slit width is open, and the scattering slit is 8.0 mm. For the obtained X-ray diffraction data, a peak derived from Kα2 is not removed, and by applying "PDXL" which is software attached to the X-ray diffraction apparatus, full widths at half maximum for diffraction peaks at $2\theta=18.6\pm1°$ and $2\theta=44\pm1°$ are determined, and defined as FWHM (003) and FWHM (104), respectively. These diffraction peaks are peaks indexed to the (003) plane and the (104) plane, respectively, when attributed to the space group R3-m.

<Procedure for Measurement of Ratio of FWHM (003)/FWHM (104) in Charge State Immediately After Discharge State to FWHM (003)/FWHM (104) in Discharge State>

In the present specification, the "ratio of FWHM (003)/FWHM (104) in a charge state immediately after a discharge state to FWHM (003)/FWHM (104) in the discharge state" is a ratio where the ratio of full widths at half maximum (FWHM (003)/FWHM (104)) in a state with the battery brought to a discharge end under discharge conditions as described later is set to a denominator, and the ratio of full widths at half maximum (FWHM (003)/FWHM (104)) in a state with the battery brought to a charge end under charge conditions as described later immediately after the discharge is set to a numerator. Other discharge or charge should not be performed between the discharge and the charge.

When for a positive active material that is used for a commercially available lithium secondary battery, the "ratio of FWHM (003)/FWHM (104) in a charge state immediately after a discharge state to FWHM (003)/FWHM (104) in the discharge state" is measured, a battery, of which the number of charge-discharge histories is as small as possible, should be employed. For performing the measurement, it is necessary to take out the positive electrode by disassembling the battery in the discharge state or the charge state. In examples described later, a plurality of lithium secondary batteries each having a sufficiently small capacity were prepared, the batteries were disassembled in a discharge state or a charge state to take out positive electrode plates, and X-ray diffraction measurement was performed. However, in the case of a commercially available lithium secondary battery having a high rated capacity, it is not practical to disassemble the battery in a charge state. Thus, for performing the above-mentioned measurement for a positive active material that is used for a commercially available lithium secondary battery, first the commercially available lithium secondary battery is brought into a discharge state in accordance with the above-described procedure, and a test cell is formed in accordance with the above-described procedure.

A plurality of test cells are formed, and grouped into test cells for measuring the ratio of full widths at half maximum (FWHM (003)/FWHM (104)) in a discharge state and test cells for measuring the ratio of full widths at half maximum (FWHM (003)/FWHM (104)) in a charge state. All the test cells are brought into a charge state on a temporary basis. The charge condition here is set to constant current constant voltage charge at a charge current of 0.1 C and an end-of-charge voltage of 4.3 to 4.5 V (vs. Li/Li$^+$). As an end-of-charge condition, charge is ended at the time when the current value decreases to 1/6. Next, constant current discharge at a current of 0.1 C and a final voltage of 2.0 V (vs. Li/Li$^+$) is performed. The battery is brought into a discharge state in accordance with the above-described procedure. Here, cells for measuring the ratio of full widths at half maximum (FWHM (003)/FWHM (104)) in a discharge state are removed from a charge-discharge circuit, and the remaining test cells are brought into the charge state again. The charge condition here is set to constant current constant voltage charge at a charge current of 0.1 C and an end-of-charge voltage of 4.3 V (vs. Li/Li$^+$). As an end-of-charge condition, charge is ended at the time when the current value decreases to 1/6. The battery is brought into a charge state in accordance with the above-described procedure. A quiescent period of 10 minutes is provided between charge and discharge and between discharge and charge. Disassembly of the test cell is performed after the test cell is left standing for at least 1 hour in an open circuit state after charge or after discharge. The operation until measurement from disassembly of the test cell is carried out in an argon atmosphere at a dew point of −60° C. or lower. The positive electrode plate that has been taken out is thoroughly washed using dimethyl carbonate. The positive electrode plate is dried overnight at room temperature, a composite is then taken out from the electrode, and the aggregated powder is loosened using an agate mortar. This composite is used as a sample for X-ray diffraction measurement.

<Measurement of Porosity>

For measurement of the porosity, "autosorb iQ" manufactured by Quantachrome Instruments Inc., and control/analysis software "ASiQwin" are used. 1.00 g of a measurement target sample (lithium transition metal composite oxide particles) is placed in a sample tube for measurement, and vacuum-dried at 120° C. for 12 h to sufficiently remove moisture in the measurement sample. Next, by a nitrogen gas adsorption method using liquid nitrogen, isotherms on the adsorption side and the desorption side are measured at a relative pressure P/P0 (P0=about 770 mmHg) ranging from 0 to 1. Then, a pore distribution is evaluated by performing a calculation by BJH method using the isotherm on the desorption side, and a pore volume ΔV is determined. In addition, separately, the true density d of lithium transition metal composite oxide particles is determined by true density measurement with a helium gas using "ULTRAPYCNOMETER 1000" manufactured by Quantachrome Instruments Inc. Using these results, the porosity is calculated from the following equation.

$$(porosity) = \Delta V / (1/d + \Delta V) \times 100 \, (\%)$$

<Measurement of Crystallite Size>

The crystallite size is measured under the following conditions. A structure model in which the element position in the space group R3-m is set to (0, 0, 1/2) for Li, (0, 0, 0) for the transition metal, (0, 0, z) (z is an oxygen position parameter) for oxygen is applied to a profile obtained by the X-ray diffraction measurement, and fitting is performed by Rietveld analysis. RIETAN-2000 is used for analysis, a pseudo-Voigt function of TCH is used as a profile function, and refinement of each parameter is performed until $R_{wp}$ is below 2. A value obtained when X, which is one parameter of the refined Lorentz factor, is substituted into the following equation is determined as a crystallite size. Here, when a Cu dry bulb is used as an X-ray source, an X-ray wavelength of 0.154 nm is employed.

$$(crystallite \, size) = 180 \times 0.9 \times (X\text{-ray wavelength}) / \pi X$$

<Measurement of DCR after Cycle>

Measurement of DCR (direct current resistance) after cycle is performed under the following conditions. A measurement target battery is adjusted to a state in which the state of charge (SOC) is 50% on the basis of a charge-discharge capacity known from the result of performing constant current charge-discharge with a current of 0.1 C and a voltage of 4.35 to 2.0 V. From the state, the battery is discharged with a discharge current of 0.1 C for 10 seconds. After a quiescent period of 10 minutes, auxiliary charge is performed with charge current of 0.1 C for 10 seconds. After a quiescent period of 10 minutes, the battery is discharged with a discharge current of 0.3 C for 10 seconds. After a quiescent period of 10 minutes, auxiliary charge is performed with charge current of 0.1 C for 30 seconds. After a quiescent period of 10 minutes, the battery is discharged with a discharge current of 0.5 C for 10 seconds. The DCR is calculated from a voltage drop at the time of performing discharge for 10 seconds at each current rate.

<Measurement of Storage Life Performance>

The capacity recovery rate and the resistance increase rate are measured under the following conditions. Prior to a storage test, a measurement target battery is subjected to constant current charge-discharge with a current of 0.1 C and a voltage of 4.35 to 2.0 V at 25° C., the "discharge capacity (mAh) before storage test" is determined, and the "internal resistance (Ω) before storage test" is determined using a contact resistance meter with AC 1 kHz. Next, the battery is subjected to constant current constant voltage charge with a charge current of 0.1 C, a charge voltage of 4.35 V and a charge time of 15 hours, and then left standing in a thermostatic bath at 45° C. for 14 days in an open circuit state. Thereafter, the battery is taken out from the thermostatic bath, and subjected to constant current discharge with a discharge current of 0.1 C and an end-of-discharge voltage of 2.0 V at 25° C., the "discharge capacity after storage test" is determined, and the "internal resistance (Ω) after storage test" is determined using a contact resistance meter at AC 1 kHz. Values determined from the following equations are defined as a "capacity recovery rate" and a "resistance increase rate", respectively.

capacity recovery rate=(discharge capacity after storage test)/(discharge capacity before storage test)×100 resistance increase rate=(internal resistance after storage test)/(internal resistance before storage test)×100

EXAMPLES

Examples corresponding to the first embodiment of the present invention will be described as Example 1 below.

Example 1

Example 1-1

<Precursor Preparing Step>

In preparation of a positive active material for a lithium secondary battery, a hydroxide precursor was prepared using a reaction crystallization method. First, nickel sulfate hexahydrate (350.5 g), cobalt sulfate heptahydrate (374.8 g) and manganese sulfate pentahydrate (321.5 g) were weighed, and totally dissolved in 4 L of ion-exchange water to prepare a 1.0 mol/L sulfate aqueous solution of which the molar ratio of Ni:Co:Mn was 1:1:1. Next, 2 L of an aqueous solution obtained by dissolving ammonium fluoride in ion exchange water so as to attain a concentration of 0.01 mol/L was poured into a 5 L reaction tank, and an Ar gas was bubbled for 30 min to remove oxygen contained in the ion-exchange water. The temperature of the reaction tank was set at 50° C. (±2° C.), and the reaction tank was set so as to have a sufficient convection therein while the contents in the reaction tank was stirred at a rotation speed of 1500 rpm using a paddle impeller equipped with a stirring motor. The sulfate aqueous solution was added dropwise to the reaction tank at a rate of 3 ml/min. Here, during a time period between the start and the end of the dropwise addition, a mixed alkaline solution including 4.0 mol/L sodium hydroxide, 0.5 mol/L aqueous ammonia and 0.5 M hydrazine was appropriately added dropwise to perform control so that the pH in the reaction tank was always 11.0 (±0.1), and a part of the reaction solution was discharged through overflow to perform control so that the total amount of the reaction solution was always 2 L or less. After completion of dropwise addition, stirring the contents in the reaction tank was continued for further 3 h. After stirring was stopped, the reaction tank was left standing at room temperature for 12 h or more.

Next, hydroxide precursor particles generated in the reaction tank were separated using a suction filtration device, sodium ions deposited on the particles were further washed off using ion-exchange water, and the particles were dried at 80° C. for 20 h under normal pressure in air atmosphere using an electric furnace. Thereafter, the particles were crushed by an automatic mortar made of agate for several minutes for equalizing the particle size. In this way, a hydroxide precursor was prepared.

<Firing Step>

Lithium hydroxide monohydrate (0.887 g) and lithium fluoride (0.006 g) were added to the hydroxide precursor (1.898 g), and the mixture was adequately mixed using an automatic mortar made of agate to prepare a mixed powder of which the molar ratio of Li:(Ni, Co, Mn):F was 1:1:0.01. The powder was molded at a pressure of 6 MPa using a pellet molding machine to form a pellet having a diameter of 25 mm. The amount of the mixed powder subjected to pellet molding was determined by performing conversion calculation so that the mass as an expected final product would be 2 g. One of the pellets was placed in an alumina boat having a total length of about 100 mm, the boat was placed in a box-type electric furnace (model: AMF 20), the temperature was elevated from ordinary temperature to 900° C. under normal pressure in an air atmosphere over 10 hours, and the pellet was fired at 900° C. for 5 h. The box-type electric furnace had an internal dimension of 10 cm (height), 20 cm (width) and 30 cm (depth), and was provided with electrically heated wires at intervals of 20 cm in the width direction. After firing, a heater was switched off, and the alumina boat was naturally cooled as it was left standing in the furnace. As a result, the temperature of the furnace decreased to about 200° C. after 5 hours, but the subsequent temperature fall rate was slightly low. After elapse of a whole day and night, the pellet was taken out after confirming that the temperature of the furnace was not higher than 100° C., and crushed by an automatic mortar made of agate for several minutes for equalizing the particle size. In this way, a lithium transition metal composite oxide $LiNi_{1/3}Co_{1/3}Mn_{1/3}O_2$ in Example 1-1 was prepared.

Examples 1-2 to 1-5

Except that the addition amount of lithium fluoride in preparation of the mixed powder in the firing step was changed to 0.012 g, 0.018 g, 0.024 g and 0.030 g, the same procedure as in Example 1-1 was carried out to prepare lithium transition metal composite oxides $LiNi_{1/3}Co_{1/3}Mn_{1/3}O_2$ in Examples 1-2 to 1-5, respectively.

Examples 1-6 and 1-7

Except that lithium sulfate (0.012 g) or lithium phosphate (0.008 g) was added in place of lithium fluoride in preparation of the mixed powder in the firing step, the same procedure as in Example 1 was carried out to prepare lithium transition metal composite oxides $LiNi_{1/3}Co_{1/3}Mn_{1/3}O_2$ in Examples 1-6 and 1-7, respectively.

Examples 1-8 to 1-12

Except that the molar ratio of Ni:Co:Mn in the precursor preparing step was changed from 1:1:1 to 6:0:4, 5:0:5, 5:1:4, 5:2:3 or 5:3:2, the same procedure as in Example 1-1 was carried out to prepare lithium transition metal composite oxides $LiNi_{0.6}Mn_{0.4}O_2$, $LiNi_{0.5}Mn_{0.5}O_2$, $LiNi_{0.5}Co_{0.1}Mn_{0.4}O_2$, $LiNi_{0.5}Co_{0.2}Mn_{0.3}O_2$ and $LiNi_{0.5}Co_{0.3}Mn_{0.2}O_2$ in Examples 1-8 to 1-12, respectively.

Comparative Example 1-1

Except that an ammonium fluoride aqueous solution was not added in the precursor preparing step, the same procedure as in Example 1-1 was carried out to prepare a lithium transition metal composite oxide $LiNi_{1/3}Co_{1/3}Mn_{1/3}O_2$ in Comparative Example 1-1.

Comparative Example 1-2

Except that lithium fluoride was not added in preparation of the mixed powder in the firing step, the same procedure as in Example 1-1 was carried out to prepare a lithium transition metal composite oxide $LiNi_{1/3}Co_{1/3}Mn_{1/3}O_2$ in Comparative Example 1-2.

Comparative Example 1-3

Except that an ammonium fluoride aqueous solution was not added in the precursor preparing step, and lithium fluoride was not added in preparation of the mixed powder in the firing step, the same procedure as in Example 1-1 was carried out to prepare a lithium transition metal composite oxide $LiNi_{1/3}Co_{1/3}Mn_{1/3}O_2$ in Comparative Example 1-3.

For the lithium transition metal composite oxides in Examples 1-1 to 1-12 and Comparative Examples 1-1 to 1-3, powder X-ray diffraction measurement was performed under the above-mentioned conditions using an X-ray diffraction apparatus (manufactured by Rigaku Corporation, model name: MiniFlex II).

As a result, it was confirmed that all of the lithium transition metal composite oxides prepared in Examples and Comparative Examples had an α-NaFeO$_2$ structure.

For the lithium transition metal composite oxides in Examples 1-1 to 1-10 and Comparative Examples 1-1 to 1-3, the particle size distribution was measured in accordance with the above-described procedure. The value of D50 acquired here was recorded as "initial D50".

<Preparation of Positive Electrode for Lithium Secondary Battery>

Using the lithium transition metal composite oxide in each of Examples 1-1 to 1-12 and Comparative Examples 1-1 to 1-3 as a positive active material for a lithium secondary battery, a positive electrode for a lithium secondary battery was prepared in accordance with the following procedure. A coating paste was prepared in which the positive active material, acetylene black (AB) and polyvinylidene fluoride (PVdF) were kneaded at a ratio of 90:5:5 in terms of a mass ratio and dispersed with N-methylpyrrolidone as a dispersion medium. The coating paste was applied to one surface of an aluminum foil current collector having a thickness of 20 μm to prepare a positive electrode plate. The mass and the coating thickness of the active material coated per fixed area was equalized so that test conditions were the same among the lithium secondary batteries of all Examples and Comparative Examples.

<Preparation of Lithium Secondary Battery>

For a negative electrode of the lithium secondary battery, a metal lithium electrode or a graphite electrode was used.

The metal lithium electrode was prepared in the following manner: metal lithium having a capacity sufficiently larger than the theoretical capacity of the positive electrode was attached to a nickel current collector.

The graphite electrode was prepared in the following manner: a coating paste formed by kneading and dispersing graphite, styrene-butadiene rubber (SBR) and carboxymethyl cellulose (CMC) at a mass ratio of 96.7:2.1:1.2 with water used as a dispersion medium was applied to one surface of 10 μm-thick copper foil current collector, and dried. The coating amount of the coating paste was adjusted so that the capacity of the battery was not limited by the negative electrode when the negative electrode was combined with the positive electrode plate.

Using the positive electrode prepared using the lithium transition metal composite oxide in each of Examples 1-1 to 1-12 and Comparative Examples 1-1 to 1-3, lithium secondary batteries with a metal lithium electrode used as a negative electrode (two batteries for each positive electrode) and a lithium secondary battery with a graphite electrode used as a negative electrode (one battery for each positive electrode) were prepared.

As a nonaqueous electrolyte, a solution obtained by dissolving $LiPF_6$, in a concentration of 1 mol/L, in a mixed solvent of ethylene carbonate (EC)/ethylmethyl carbonate (EMC)/dimethyl carbonate (DMS) in a volume ratio of 6:7:7, was used. As a separator, a microporous film made of polypropylene, the surface of which was modified with polyacrylate, was used. As an outer case, a metal resin composite film made of polyethylene terephthalate (15 μm)/aluminum foil (50 μm)/metal-adhesive polypropylene film (50 μm) was used. The electrode was stored such that the open ends of a positive electrode terminal and a negative electrode terminal were externally exposed, fusion margins with the inner surfaces of the aforementioned metal resin composite films facing each other were airtightly sealed except a portion forming an electrolyte solution filling hole, and the nonaqueous electrolyte was injected, followed by sealing the electrolyte solution filling hole.

<Ratio of FWHM (003)/FWHM (104) in Charge State Immediately After Discharge State to FWHM (003)/FWHM (104) in Discharge State>

For two lithium secondary batteries prepared using the positive electrode in each of Examples and Comparative Examples and using a metal lithium electrode as a negative electrode, 2-cycle initial charge-discharge was performed at 25° C. Charge was constant current constant voltage charge with a current of 0.1 C and a voltage of 4.45 V, and the charge termination condition was set at a time point at which the current value decreased to 1/6. Discharge was constant current discharge with a current of 0.1 C and a final voltage of 2.0 V. Here, a quiescent period of 10 minutes was provided each after charge and after discharge. The discharge capacity at the second cycle was defined as an "initial discharge capacity". After the initial discharge capacity was confirmed, the positive electrode plate was taken out in accordance with the above-described procedure for one battery among the batteries in each of Examples and Comparative Examples, and the ratio of full widths at half maximum (FWHM (003)/FWHM (104)) in a discharge state was measured.

For other batteries in each of Examples and Comparative Examples, charge was performed in accordance with the above-described procedure, the positive electrode plate was taken out in accordance with the above-described procedure, and the ratio of full widths at half maximum (FWHM (003)/FWHM (104)) in a charge state was measured.

A value calculated from the ratio of full widths at half maximum (FWHM (003)/FWHM (104)) in a discharge state as a denominator and the ratio of full widths at half maximum (FWHM (003)/FWHM (104)) in a charge state as a numerator using the above measurement results was determined as a "ratio of FWHM (003)/FWHM (104) in charge state immediately after discharge state to FWHM (003)/FWHM (104) in discharge state".

<Initial Charge-Discharge Step>

For the lithium secondary battery prepared using the positive electrode in each of Examples and Comparative Examples and using a graphite electrode as a negative electrode, 2-cycle initial charge-discharge was performed at 25° C. Charge was constant current constant voltage charge with a current of 0.1 C and a voltage of 4.35 V, and the charge termination condition was set at a time point at which the current value decreased to 1/6. Discharge was constant current discharge with a current of 0.1 C and a final voltage of 2.0 V. Here, a quiescent period of 10 minutes was provided each after charge and after discharge. The initial discharge capacity was confirmed.

<Charge-Discharge Cycle Test>

Subsequently, a 100-cycle charge-discharge cycle test was conducted. Charge was constant current constant voltage charge with a current of 1 C and a voltage of 4.35 V, and the charge termination condition was set at a time point at which the current value decreased to 1/6. Discharge was constant current discharge with a current of 1 C and a final voltage of 2.0 V. Here, a quiescent period of 10 minutes was provided each after charge and after discharge.

The percentage ratio of the discharge capacity at the 100th cycle to the discharge capacity at the first cycle in the charge-discharge cycle test was calculated, and defined as a "1 C capacity retention ratio (%)".

<Measurement of Particle Size Distribution>

The battery after charge-discharge cycle test was disassembled in accordance with the above-described procedure to take out the positive electrode, carbon as a conductive agent and the PVdF binder as a binding agent are removed in accordance with the above-described procedure to take out positive active material particles, and the particle size distribution was measured in accordance with the above-described procedure. The value of D50 acquired here was recorded as "D50 after cycle".

Table 1 shows the molar ratio of Ni:Co:Mn in the lithium transition metal composite oxide, the conditions for preparation of the positive active material (whether or not $NH_4F$ is added during preparation of the precursor, and presence/absence and the type of the sintering aid), the initial D50, the ratios (FWHM (003)/FWHM (104)) in the discharge state and the charge state of the lithium secondary battery using the lithium transition metal composite oxide as a positive active material, the ratio of FWHM (003)/FWHM (104) in the charge state immediately after the discharge state to FWHM (003)/FWHM (104) in the discharge state, D50 after 100 cycles, and the 1 C capacity retention ratio in each of Examples 1-1 to 1-12 and Comparative Examples 1-1 to 1-3.

TABLE 1

| | Ni:Co:Mn | NH4F added during preparation of precursor | Sintering aid | FWHM (003)/ FWHM (104) at discharge state | FWHM (003)/ FWHM (104) at charge state | FWHM (003)/ FWHM (104) at discharge state → charge state | FWHM (104) | Porosity [%] | Initial D50 [μm] | D50 after cycle [μm] | 1 C capacity retention ratio [%] |
|---|---|---|---|---|---|---|---|---|---|---|---|
| Example 1-1 | 1:1:1 | Added | LiF1% | 0.90 | 0.65 | 0.72 | 0.144 | 3.3 | 13.2 | 12.8 | 92 |
| Example 1-2 | 1:1:1 | Added | LiF2% | 0.91 | 0.67 | 0.74 | 0.144 | 3.3 | 13.4 | 12.8 | 92 |
| Example 1-3 | 1:1:1 | Added | LiF3% | 0.90 | 0.68 | 0.75 | 0.144 | 3.3 | 13.5 | 12.9 | 93 |
| Example 1-4 | 1:1:1 | Added | LiF4% | 0.89 | 0.68 | 0.76 | 0.144 | 3.3 | 13.5 | 12.9 | 93 |
| Example 1-5 | 1:1:1 | Added | LiF5% | 0.89 | 0.70 | 0.78 | 0.144 | 3.3 | 13.6 | 12.9 | 93 |
| Example 1-6 | 1:1:1 | Added | $Li_2SO_4$ | 0.89 | 0.71 | 0.80 | 0.144 | 3.3 | 13.4 | 12.7 | 92 |
| Example 1-7 | 1:1:1 | Added | $Li_3PO_4$ | 0.89 | 0.70 | 0.78 | 0.144 | 3.3 | 13.4 | 12.6 | 92 |
| Example 1-8 | 6:0:4 | Added | LiF1% | 0.96 | 0.73 | 0.76 | 0.142 | 3.5 | 13.2 | 12.6 | 90 |
| Example 1-9 | 5:0:5 | Added | LiF1% | 0.95 | 0.73 | 0.77 | 0.143 | 3.4 | 13.2 | 12.6 | 91 |
| Example 1-10 | 5:1:4 | Added | LiF1% | 0.95 | 0.73 | 0.77 | 0.143 | 3.4 | 13.2 | 12.6 | 92 |
| Example 1-11 | 5:2:3 | Added | LiF1% | 0.96 | 0.74 | 0.78 | 0.143 | 3.4 | 13.2 | 12.6 | 92 |
| Example 1-12 | 5:3:2 | Added | LiF1% | 0.97 | 0.75 | 0.78 | 0.143 | 3.4 | 13.2 | 12.5 | 92 |
| Comparative Example 1-1 | 1:1:1 | Not added | LiF1% | 0.93 | 0.66 | 0.70 | 0.144 | 3.7 | 13.1 | 5.8 | 86 |
| Comparative Example 1-2 | 1:1:1 | Added | Not added | 0.93 | 0.64 | 0.69 | 0.144 | 3.8 | 13.1 | 5.7 | 86 |
| Comparative Example 1-3 | 1:1:1 | Not added | Not added | 0.99 | 0.67 | 0.67 | 0.144 | 3.9 | 12.9 | 5.2 | 85 |

From Table 1, it is apparent that in lithium secondary batteries including a positive active material in which the ratio of FWHM (003)/FWHM (104) in the charge state immediately after the discharge state to FWHM (003)/FWHM (104) in the discharge state is 0.72 or more (Examples 1-1 to 1-12), 94% or more of the initial D50 of the active material is retained even after 100 cycles, and cracks of active material particles hardly occur. In addition, it is apparent that these batteries are excellent in 1 C capacity retention ratio.

On the other hand, it is apparent that in lithium secondary batteries including a positive active material in which the ratio of FWHM (003)/FWHM (104) in the charge state immediately after the discharge state to FWHM (003)/FWHM (104) in the discharge state is less than 0.72 (Comparative Examples 1-1 to 1-3), the D50 of the active material after 100 cycles is not more than half the initial D50, cracks of active material particles progress, and the 1 C capacity retention ratio is low.

It is also apparent that when the ratio of FWHM (003)/FWHM (104) in the charge state immediately after the discharge state to FWHM (003)/FWHM (104) in the discharge state is 0.72 or more, cracks of active material particles are suppressed even when a lithium transition metal composite oxide in which the ratio of Ni:Co:Mn is not 1:1:1 is used as in Examples 1-8 to 1-12.

In addition, as shown in Table 1, a positive active material in which the ratio of FWHM (003)/FWHM (104) in the charge state immediately after the discharge state to FWHM (003)/FWHM (104) in the discharge state is 0.72 or more can be prepared by using a lithium transition metal composite oxide obtained in the following manner: LiF, $Li_2SO_4$ and $Li_3PO_4$ as sintering aids are added in a precursor prepared by coprecipitating a compound containing Ni, Co and Mn in a solution containing fluorine ions ($NH_4F$), and the mixture is fired.

In Comparative Examples 1-1 and 1-3, it is difficult for F to exist in active material particles, and in Comparative Examples 1-2 and 1-3, F, S, and P from the sintering aid do not exist on the surfaces of active material particles. Therefore, it is presumed that in Comparative Examples 1-1 to 1-3, cracks with charge-discharge cycles cannot be suppressed because there is no condition under which sufficient sintering is performed.

Figure 2:
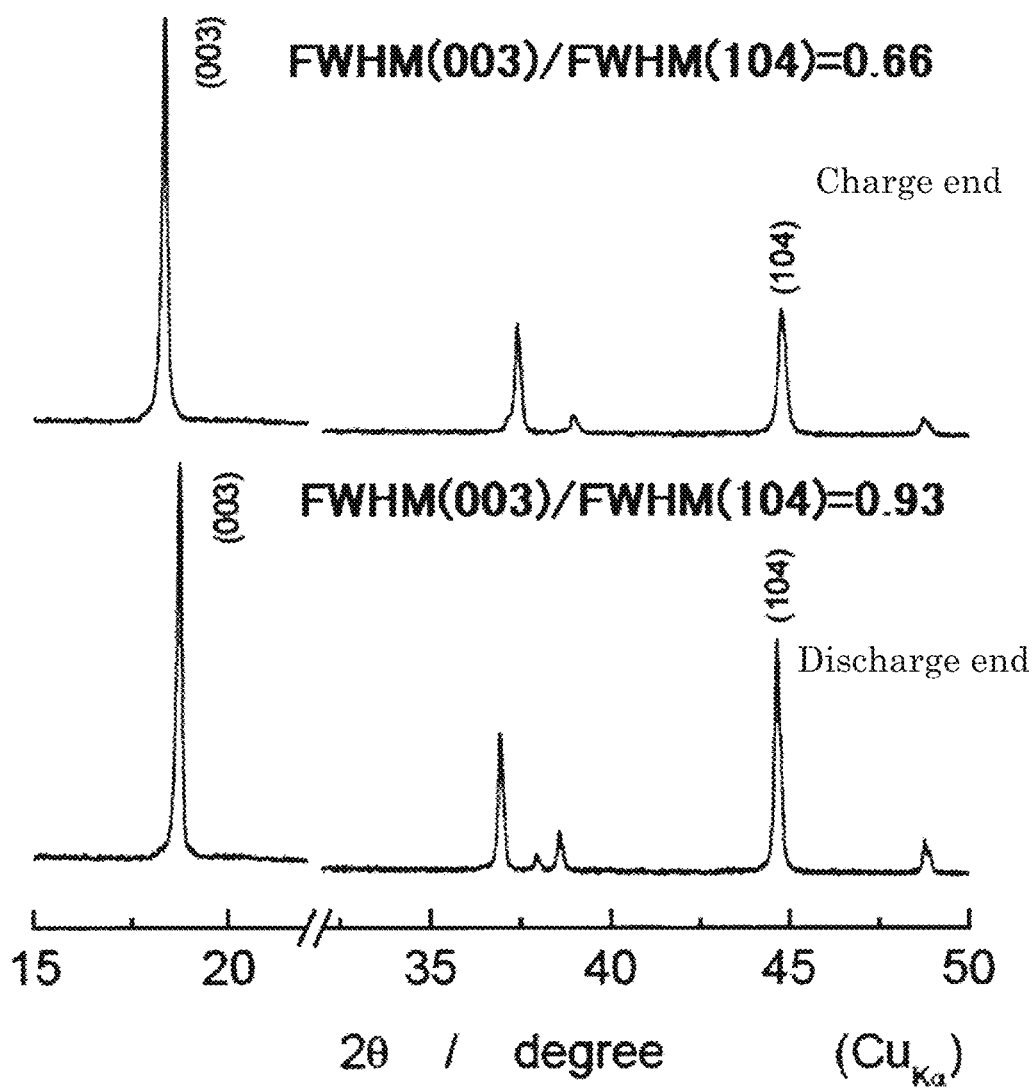
FIG. 2 is a powder X-ray diffraction diagram at a discharge end and a charge end for a positive active material in a comparative example of the first embodiment.
Figure 3:
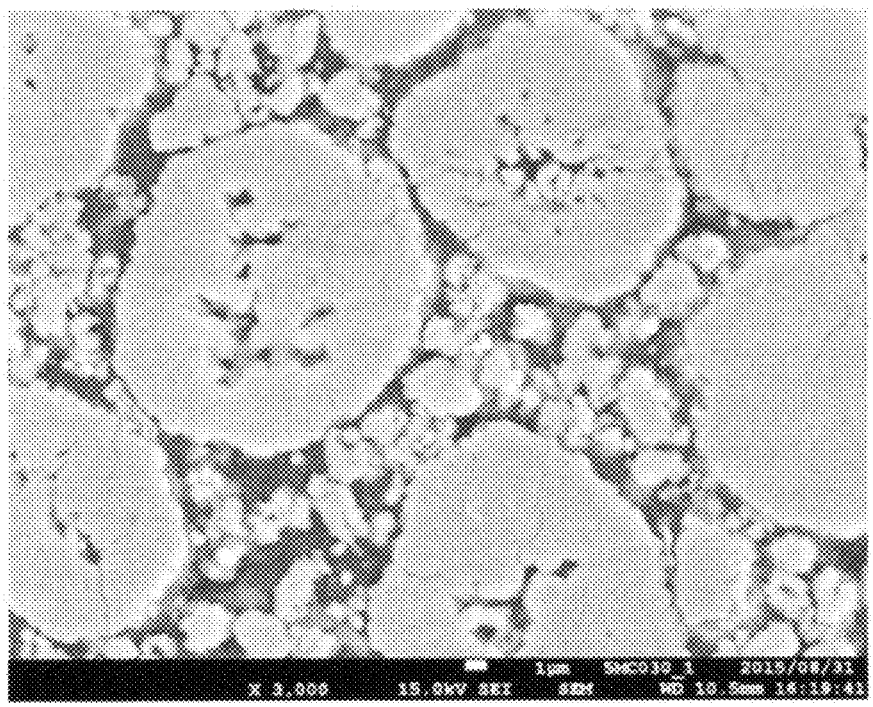
FIG. 3 shows a photograph after initial charge for lithium transition metal composite oxide particles in a conventional technique.
Figure 4:
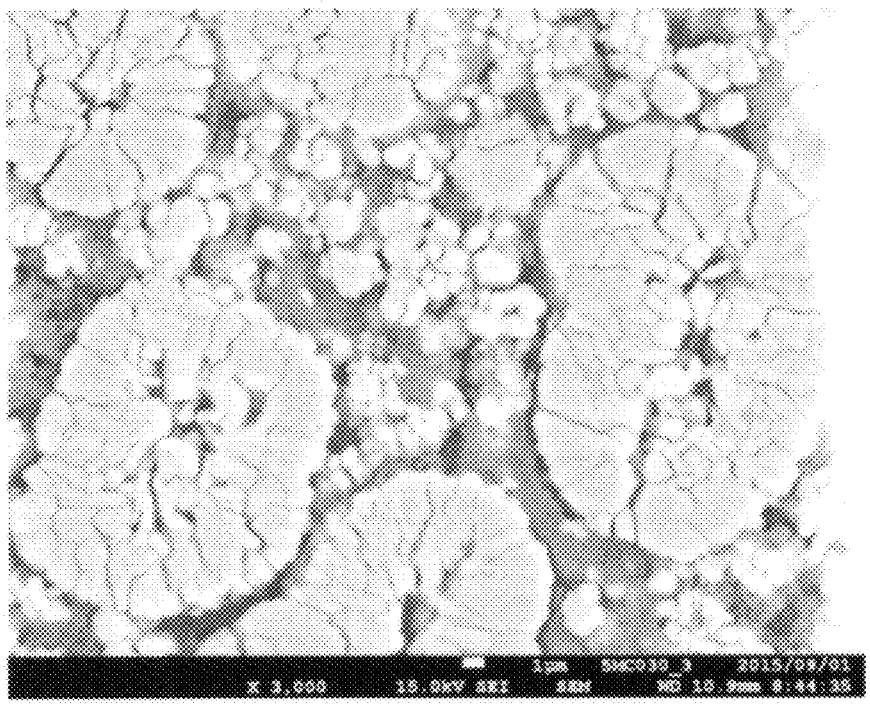
FIG. 4 shows a photograph after 500 cycles for lithium transition metal composite oxide particles in a conventional technique.

FIG. 1 is a powder X-ray diffraction diagram at a discharge state and a charge state for a positive active material in Example 1-5. In addition, FIG. 2 is a powder X-ray diffraction diagram at a discharge state and a charge state for a positive active material in Comparative Example 1-1.

Examples corresponding to the second embodiment of the present invention will be described as Example 2 below.

Example 2

Example 2-1

Except that in the precursor preparing step, nickel sulfate hexahydrate (473.1 g), cobalt sulfate heptahydrate (281.1 g) and manganese sulfate pentahydrate (289.3 g) were weighed, and totally dissolved in 4 L of ion-exchange water to prepare a 1.0 M sulfate aqueous solution of which the molar ratio of Ni:Co:Mn was 45:25:30, the same procedure as in Example 1-1 was carried out to prepare a hydroxide precursor.

Except that in the firing step, lithium hydroxide monohydrate (0.886 g) and lithium fluoride (0.006 g) were added to the hydroxide precursor (1.897 g) to prepare a mixed powder of which the molar ratio of Li:(Ni, Co, Mn):F was 1:1:0.01, the same procedure as in Example 1-1 was carried out to perform firing (pellet firing temperature: 900° C.) to prepare a lithium transition metal composite oxide $LiNi_{0.45}Co_{0.25}Mn_{0.30}O_2$ in Example 2-1.

Examples 2-2 to 2-6

Figure 8:
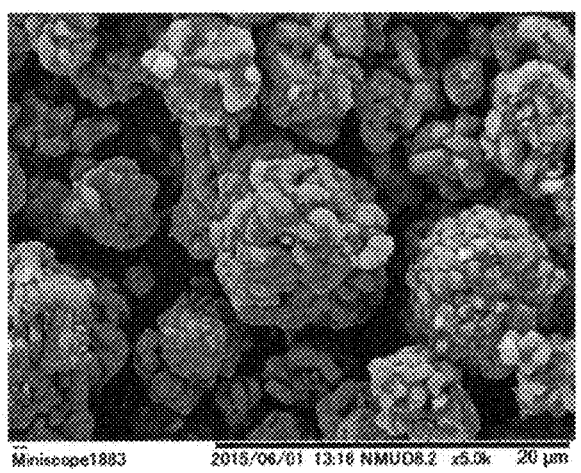
FIG. 8 shows a photograph of lithium transition metal composite oxide particles in Example 2-4.

Except that the temperature for firing the pellet in the firing step was changed from 900° C. to 920° C., 940° C., 960° C., 980° C. and 1000° C., the same procedure as in Example 2-1 was carried out to prepare a lithium transition metal composite oxide $LiNi_{0.45}Co_{0.25}Mn_{0.30}O_2$ in Examples 2-2 to 2-6, respectively. FIG. 8 shows a photograph of lithium transition metal composite oxide particles in Example 2-4.

Examples 2-7 to 2-9

Except that the molar ratio of Ni:Co:Mn in the precursor preparing step was changed from 45:25:30 to 40:30:30, 50:25:25 and 55:20:25, the same procedure as in Example 2-4 was carried out to prepare lithium transition metal composite oxides $LiNi_{0.40}Co_{0.30}Mn_{0.30}O_2$, $LiNi_{0.50}Co_{0.25}Mn_{0.25}O_2$ and $LiNi_{0.55}Co_{0.20}Mn_{0.25}O_2$ in Examples 2-7 to 2-9, respectively.

Examples 2-10 and 2-11

Except that the molar ratio of Ni:Co:Mn in the precursor preparing step was changed from 45:25:30 to 60:0:40 and 50:0:50, the same procedure as in Example 2-6 was carried out to prepare lithium transition metal composite oxides $LiNi_{0.60}Mn_{0.40}O_2$ and $LiNi_{0.50}Mn_{0.50}O_2$ in Examples 2-10 and 2-11, respectively.

Example 2-12

Except that lithium sulfate (0.012 g) was added in place of lithium fluoride (0.006 g) in preparation of the mixed powder in the firing step, the same procedure as in Example 2-4 was carried out to prepare a lithium transition metal composite oxide $LiNi_{0.45}Co_{0.25}Mn_{0.30}O_2$ in Example 2-12.

Example 2-13

Except that lithium phosphate (0.008 g) was added in place of lithium fluoride (0.006 g) in preparation of the mixed powder in the firing step, the same procedure as in Example 2-4 was carried out to prepare a lithium transition metal composite oxide $LiNi_{0.45}Co_{0.25}Mn_{0.30}O_2$ in Example 2-13.

Example 2-14

Except that in the precursor preparing step, a hydroxide precursor was prepared without adding an ammonium fluoride aqueous solution, and in the firing step, ammonium fluoride (0.009 g) was added in place of lithium fluoride (0.006 g) to prepare a mixed powder of which the molar ratio of Li:(Ni, Co, Mn):F was 1:1:0.01, the same procedure as in Example 2-6 was carried out to prepare a lithium transition metal composite oxide $LiNi_{0.45}Co_{0.25}Mn_{0.30}O_2$ in Example 2-14.

Comparative Examples 2-1 and 2-2

Except that the temperature for firing the pellet in the firing step was changed from 900° C. to 880° C. and 1050° C., the same procedure as in Example 2-1 was carried out to prepare lithium transition metal composite oxides $LiNi_{0.45}Co_{0.25}Mn_{0.30}O_2$ in Comparative Examples 2-1 and 2-2, respectively.

Comparative Example 2-3

Figure 9:
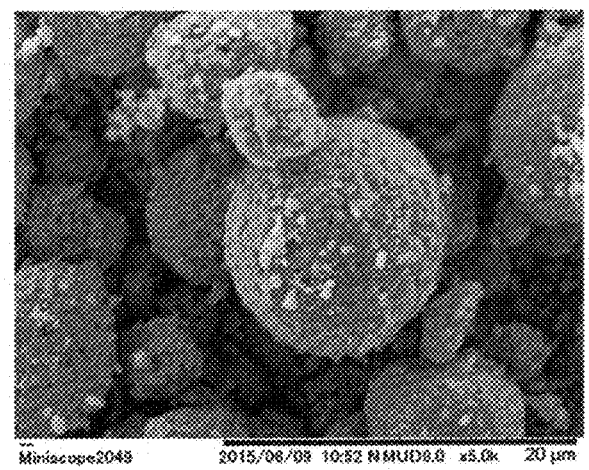
FIG. 9 shows a photograph of lithium transition metal composite oxide particles in Comparative Example 2-3.

Except that an ammonium fluoride aqueous solution was not added in the precursor preparing step, and lithium fluoride was not added in preparation of the mixed powder in the firing step, the same procedure as in Example 2-1 was carried out to prepare a lithium transition metal composite oxide $LiNi_{0.45}Co_{0.25}Mn_{0.30}O_2$ in Comparative Example 2-3. FIG. 9 shows a photograph of lithium transition metal composite oxide particles in this comparative example.

Comparative Example 2-4

Except that an ammonium fluoride aqueous solution was not added in the precursor preparing step, the same procedure as in Example 2-1 was carried out to prepare a lithium transition metal composite oxide $LiNi_{0.45}Co_{0.25}Mn_{0.30}O_2$ in Comparative Example 2-4.

Comparative Example 2-5

Except that lithium fluoride was not added in preparation of the mixed powder in the firing step, the same procedure as in Example 2-1 was carried out to prepare a lithium transition metal composite oxide $LiNi_{0.45}Co_{0.25}Mn_{0.30}O_2$ in Comparative Example 2-5.

Comparative Examples 2-6 and 2-7

Except that the molar ratio of Ni:Co:Mn in the precursor preparing step was changed from 45:25:30 to 80:10:10, and the temperature for firing the pellet in the firing step was changed from 900° C. to 700° C. and 800° C., the same procedure as in Example 2-1 was carried out to prepare lithium transition metal composite oxides $LiNi_{0.80}Co_{0.10}Mn_{0.10}O_2$ in Examples 2-6 and 2-7, respectively.

<Measurement of Full Width at Half Maximum>

For the lithium transition metal composite oxides in Examples 2-1 to 2-14 and Comparative Examples 2-1 to 2-7, powder X-ray diffraction measurement was performed under the above-mentioned conditions using an X-ray diffraction apparatus (manufactured by Rigaku Corporation, model name: MiniFlex II), so that the full width at half maximum (FWHM (104)) for a diffraction peak present at $2\theta=44°\pm1°$ was determined.

In addition, it was confirmed that all the lithium transition metal composite oxides in Examples and Comparative Examples had an $\alpha$-$NaFeO_2$ structure.

<Measurement of Porosity>

For the lithium transition metal composite oxides in Examples 2-1 to 2-14 and Comparative Examples 2-1 to 2-7, the pore volume $\Delta V$ was determined under the above-described conditions using "autosorb iQ" and control/analysis software "ASiQwin" manufactured by Quantachrome Instruments Inc., the true density d was determined using "ULTRAPYCNOMETER 1000" manufactured by Quantachrome Instruments Inc., and the porosity was calculated.

<Preparation of Lithium Secondary Battery>

Using the positive electrode prepared in the same manner as in Example 1 except that the lithium transition metal composite oxide in each of Examples 2-1 to 2-14 and Comparative Examples 2-1 to 2-7 was used as a positive active material, the graphite electrode (negative electrode) and the nonaqueous electrolyte, a lithium secondary battery was prepared in the same manner as in Example 1.

<Initial Charge-Discharge Step>

The prepared lithium secondary battery was subjected to an initial charge-discharge step at 25° C. Charge was constant current constant voltage charge with a current of 0.1 C and a voltage of 4.6 V, and the charge termination condition was set at a time point at which the current value decreased to 1/6. Discharge was constant current discharge with a current of 0.1 C and a final voltage of 2.0 V. This charge-discharge was carried out 2 cycles. Here, a quiescent period of 30 minutes was provided each after charge and after discharge.

<Charge-Discharge Cycle Test>

Subsequently, a 100-cycle charge-discharge cycle test was conducted under the same conditions as in Example 1.

The percentage ratio of the discharge capacity at the 100th cycle to the discharge capacity at the first cycle in the charge-discharge cycle test was calculated, and defined as a "1 C capacity retention ratio (%)".

Table 2 shows the molar ratio of Ni:Co:Mn in the lithium transition metal composite oxide, the FWHM (104), the porosity, the conditions for preparation of the positive active material (whether or not coprecipitation $NH_4F$ is added, the type of sintering aid and the firing temperature), and the test results for the lithium secondary battery including the lithium transition metal composite oxide as a positive active material in each of Examples 2-1 to 2-14 and Comparative Examples 2-1 to 2-7.

When the firing temperature is excessively low, the porosity is more than 3.5% (Comparative Examples 2-1 and 2-6), and the FWHM (104) may be more than 0.145° (Comparative Example 2-1), and when the firing temperature is excessively high, the FWHM (104) is less than 0.125° (Comparative Example 2-2). Therefore, the firing temperature is preferably 900 to 1000° C. for improving charge-discharge cycle performance.

In addition, when the content of Ni is excessively large, the FWHM (104) may be less than 0.125° (Comparative

TABLE 2

|  | Molar ratio of Ni:Co:Mn | $NH_4F$ added or not | Type of sintering aid | Firing temperature [° C.] | FWHM (104) [°] | Porosity [%] | 1 C capacity retention ratio [%] |
|---|---|---|---|---|---|---|---|
| Example 2-1 | 45:25:30 | Added | LiF | 900 | 0.145 | 3.5 | 96 |
| Example 2-2 | 45:25:30 | Added | LiF | 920 | 0.140 | 3.1 | 96 |
| Example 2-3 | 45:25:30 | Added | LiF | 940 | 0.136 | 2.6 | 97 |
| Example 2-4 | 45:25:30 | Added | LiF | 960 | 0.132 | 2.2 | 98 |
| Example 2-5 | 45:25:30 | Added | LiF | 980 | 0.128 | 1.8 | 98 |
| Example 2-6 | 45:25:30 | Added | LiF | 1000 | 0.125 | 1.5 | 98 |
| Example 2-7 | 40:30:30 | Added | LiF | 960 | 0.132 | 2.2 | 96 |
| Example 2-8 | 50:25:25 | Added | LiF | 960 | 0.133 | 2.3 | 97 |
| Example 2-9 | 55:20:25 | Added | LiF | 960 | 0.135 | 2.4 | 96 |
| Example 2-10 | 60:0:40 | Added | LiF | 1000 | 0.127 | 1.7 | 96 |
| Example 2-11 | 50:0:50 | Added | LiF | 1000 | 0.126 | 1.6 | 97 |
| Example 2-12 | 45:25:30 | Added | $Li_2SO_4$ | 960 | 0.132 | 2.2 | 97 |
| Example 2-13 | 45:25:30 | Added | $Li_3PO_4$ | 960 | 0.132 | 2.2 | 97 |
| Example 2-14 | 45:25:30 | Not added | $NH_4F$ | 1000 | 0.127 | 1.9 | 91 |
| Comparative Example 2-1 | 45:25:30 | Added | LiF | 880 | 0.148 | 3.9 | 85 |
| Comparative Example 2-2 | 45:25:30 | Added | LiF | 1050 | 0.121 | 2.5 | 88 |
| Comparative Example 2-3 | 45:25:30 | Not added | Not added | 960 | 0.132 | 4.2 | 83 |
| Comparative Example 2-4 | 45:25:30 | Not added | LiF | 960 | 0.132 | 3.7 | 84 |
| Comparative Example 2-5 | 45:25:30 | Added | Not added | 960 | 0.132 | 3.8 | 84 |
| Comparative Example 2-6 | 80:10:10 | Added | LiF | 700 | 0.135 | 4.0 | 77 |
| Comparative Example 2-7 | 80:10:10 | Added | LiF | 800 | 0.123 | 3.2 | 79 |

From Table 2, it is apparent that lithium secondary batteries obtained using as a positive active material a lithium transition metal composite oxide having a FWHM (104) of 0.125 to 0.145° and a porosity of 1.5 to 3.5% (Examples 2-1 to 2-14) have a high cycle capacity retention ratio and excellent charge-discharge cycle performance.

On the other hand, the lithium secondary battery has a low cycle capacity retention ratio either when the FWHM (104) is less than 0.125° or when the FWHM (104) is more than 0.145° (see Comparative Examples 2-1, 2-2 and 2-7). In addition, even when the FWHM (104) is within a range of 0.125 to 0.145°, the lithium secondary battery has a low cycle capacity retention ratio when the porosity is more than 3.5% (see Comparative Examples 2-3 to 2-6).

Therefore, in this example, the FWHM (104) is 0.125 to 0.145°, and the porosity is 1.5 to 3.5% for improving charge-discharge cycle performance.

In addition, in this example, LiF, $Li_2SO_4$ and $Li_3PO_4$ as sintering aids are added in a precursor prepared by coprecipitating a compound containing Ni, Co and Mn in a solution containing fluorine ions ($NH_4F$), and the mixture is fired, whereby a positive active material of a lithium transition metal composite oxide having a FWHM(104) of 0.125 to 0.145° and a porosity of 1.5 to 3.5% can be prepared as shown in Table 2.

Example 2-7), and therefore the molar ratio Ni/Me of Ni to the transition metal element Me is preferably 0.4 to 0.6.

Examples corresponding to the third embodiment of the present invention will be described as Example 3 below.

Example 3

Examples 3-1 to 3-7

Except that the temperature for firing the pellet in the firing step was changed from 900° C. to 1000° C., the same procedure as in Examples 1-1 to 1-7 was carried out to prepare lithium transition metal composite oxides $LiNi_{1/3}Co_{1/3}Mn_{1/3}O_2$ in Examples 3-1 to 3-7, respectively.

Examples 3-8 to 3-12

Except that the temperature for firing the pellet in the firing step was changed from 900° C. to 1000° C., the same procedures as in Examples 1-8 to 1-12 were carried out to prepare lithium transition metal composite oxides $LiNi_{0.6}Mn_{0.4}O_2$, $LiNi_{0.5}Mn_{0.5}O_2$, $LiNi_{0.5}Co_{0.1}Mn_{0.4}O_2$, $LiNi_{0.5}Co_{0.2}Mn_{0.3}O_2$ and $LiNi_{0.5}Co_{0.3}Mn_{0.2}O_2$ in Examples 3-8 to 3-12, respectively.

Example 3-13

Except that the temperature for firing the pellet in the firing step was changed from 1000° C. to 950° C., the same procedure as in Example 1-1 was carried out to prepare a lithium transition metal composite oxide $LiNi_{1/3}Co_{1/3}Mn_{1/3}O_2$ in Examples 3-13.

Example 3-14

The same procedure as in Example 1-1 was carried out to prepare a lithium transition metal composite oxide $LiNi_{1/3}Co_{1/3}Mn_{1/3}O_2$ in Example 3-14.

Comparative Examples 3-1 to 3-3

Except that the temperature for firing the pellet in the firing step was changed from 900° C. to 1000° C., the same procedures as in Comparative Examples 1-1 to 1-3 were carried out to prepare lithium transition metal composite oxides $LiNi_{1/3}Co_{1/3}Mn_{1/3}O_2$ in Comparative Examples 3-1 to 3-3, respectively.

<Preparation of Lithium Secondary Battery>

Using the positive electrode prepared in the same manner as in Example 1 except that each of the lithium transition metal composite oxides in Examples 3-1 to 3-14 and Comparative Examples 3-1 to 3-3 was used as a positive active material, the graphite electrode (negative electrode) and the nonaqueous electrolyte, a lithium secondary battery was prepared in the same manner as in Example 1.

The prepared lithium secondary battery was subjected to an initial charge-discharge step at 25° C. Charge was constant current constant voltage charge with a current of 0.1 C and a voltage of 4.35 V, and the charge termination condition was set at a time point at which the current value decreased to 1/6. Discharge was constant current discharge with a current of 0.1 C and a final voltage of 2.0 V. This charge-discharge was carried out 2 cycles. Here, a quiescent period of 10 minutes was provided each after charge and after discharge.

<Charge-Discharge Cycle Test>

Subsequently, a 100-cycle charge-discharge cycle test was conducted under the same conditions as in Example 1.

The percentage ratio of the discharge capacity at the 100th cycle to the discharge capacity at the first cycle in the charge-discharge cycle test was calculated, and defined as a "1 C capacity retention ratio (%)".

<Measurement of Crystallite Size>

For the lithium secondary battery obtained using as a positive active material the lithium transition metal composite oxide in each of Examples 3-1 to 3-14 and Comparative Examples 3-1 to 3-3, a positive electrode plate was taken out after initial charge-discharge. A positive electrode plate brought into a discharge state by performing discharge to 2.0 V (vs. $Li/Li^+$) in accordance with the above-described procedure and a positive electrode plate brought into a charge state by performing charge to 4.45 V (vs. $Li/Li^+$) in accordance with the above-described procedure were prepared, and a positive composite was collected in accordance with the above-described procedure, and subjected to X-ray diffraction measurement under the above-described conditions to determine the crystallite size. Here, the crystallite size determined on the basis of the positive electrode plate in the charge state was recorded as a "crystallite size [nm] at SOC 100%", and the crystallite size determined on the basis of the positive electrode plate in the discharge state was recorded as a "crystallite size [nm] at SOC 0%".

<Measurement of DCR after Cycle>

For a nonaqueous electrolyte battery obtained using the lithium transition metal composite oxide, the DCR after 100 cycles as measured in accordance with the above-described procedure was recorded as a "DCR after cycle". The "DCR [Ω] after cycle" is a value at SOC 50% in the battery (graphite counter electrode).

Table 3 shows the molar ratio of Ni:Co:Mn in the lithium transition metal composite oxide, the conditions for preparation of the positive active material (whether or not coprecipitation $NH_4F$ is added, the type of sintering aid and the firing temperature), and the test results (crystallite size, DCR after cycle and 1 C capacity retention ratio) for the lithium secondary battery including the lithium transition metal composite oxide as a positive active material in each of Examples 3-1 to 3-14 and Comparative Examples 3-1 to 3-3.

TABLE 3

| | Ni:Co:Mn | $NH_4F$ added during preparation of PC | Sintering additive | Firing temperature [° C.] | Crystallite size at SOC 0% [nm] | Crystallite size at SOC 100% [nm] | Reduction amount at SOC 0% → 100% [nm] | DCR after cycle [Ω] | 1 C capacity retention ratio [%] |
|---|---|---|---|---|---|---|---|---|---|
| Example 3-1 | 1:1:1 | Added | LiF1% | 1000 | 170 | 150 | 20 | 6.9 | 95 |
| Example 3-2 | 1:1:1 | Added | LiF2% | 1000 | 175 | 160 | 15 | 6.7 | 95 |
| Example 3-3 | 1:1:1 | Added | LiF3% | 1000 | 180 | 165 | 15 | 6.6 | 95 |
| Example 3-4 | 1:1:1 | Added | LiF4% | 1000 | 185 | 175 | 10 | 6.5 | 95 |
| Example 3-5 | 1:1:1 | Added | LiF5% | 1000 | 190 | 180 | 10 | 6.5 | 95 |
| Example 3-6 | 1:1:1 | Added | $Li_2SO_4$ | 1000 | 170 | 150 | 20 | 7.0 | 95 |
| Example 3-7 | 1:1:1 | Added | $Li_3PO_4$ | 1000 | 170 | 150 | 20 | 7.2 | 95 |
| Example 3-8 | 6:0:4 | Added | LiF1% | 1000 | 170 | 150 | 20 | 7.6 | 96 |
| Example 3-9 | 5:0:5 | Added | LiF1% | 1000 | 170 | 150 | 20 | 7.4 | 97 |
| Example 3-10 | 5:1:4 | Added | LiF1% | 1000 | 170 | 150 | 20 | 7.5 | 95 |
| Example 3-11 | 5:2:3 | Added | LiF1% | 1000 | 170 | 150 | 20 | 7.3 | 95 |
| Example 3-12 | 5:3:2 | Added | LiF1% | 1000 | 170 | 150 | 20 | 7.0 | 95 |
| Example 3-13 | 1:1:1 | Added | LiF1% | 950 | 160 | 140 | 20 | 7.2 | 94 |
| Example 3-14 | 1:1:1 | Added | LiF1% | 900 | 150 | 130 | 20 | 7.5 | 92 |
| Comparative Example 3-1 | 1:1:1 | Not added | LiF1% | 1000 | 170 | 145 | 25 | 10.2 | 90 |
| Comparative Example 3-2 | 1:1:1 | Added | Not added | 1000 | 165 | 135 | 30 | 10.5 | 90 |
| Comparative Example 3-3 | 1:1:1 | Not added | Not added | 1000 | 160 | 125 | 35 | 10.7 | 89 |

From Table 3, it is apparent that the crystallite size of each active material decreases in transition from the discharge state (SOC 0%) to charge end (SOC 100%) immediately after the discharge state, and positive active materials in which the reduction amount of the crystallite size is 20 nm or less (see Examples 3-1 to 3-14) have a smaller DCR after the cycle and a higher 1 C capacity retention ratio as compared to positive active materials in which the reduction amount of the crystallite size is more than 20 nm (see Comparative Examples 3-1 to 3-3).

An example of a lithium secondary battery in which a positive electrode containing the positive active material according to this embodiment is combined with a nonaqueous electrolyte containing propylene carbonate is described as Example 4 below.

Example 4

Examples 4-1 to 4-3

The same procedure as in Example 2-1 was carried out to prepare a lithium transition metal composite oxide $LiNi_{0.45}Co_{0.25}Mn_{0.30}O_2$ for use in each of Examples 4-1 to 4-3.

Except that the lithium transition metal composite oxide was used as the positive active material, and as the solvent of the nonaqueous electrolyte, mixed solvents of ethylene carbonate (EC)/propylene carbonate (PC)/ethyl methyl carbonate (EMC) at volume ratios of 25:5:70, 20:10:70 and 27:3:70, respectively, were used in place of the mixed solvent of ethylene carbonate (EC)/ethyl methyl carbonate (EMC)/dimethyl carbonate (DMC) at a volume ratio of 6:7:7, the same procedure as in Example 2 was carried out to prepare lithium secondary batteries in Examples 4-1 to 4-3, respectively.

Examples 4-4 to 4-8

The same procedure as in Examples 2-2 to 2-6 was carried out to prepare a lithium transition metal composite oxide $LiNi_{0.45}Co_{0.25}Mn_{0.30}O_2$ for use in each of Examples 4-4 to 4-8.

Except that each of the lithium transition metal composite oxides was used as the positive active material, and as the solvent of the nonaqueous electrolyte, a mixed solvent of EC/PC/EMC at a volume ratio of 25:5:70 was used in place of the mixed solvent of EC/EMC/DMC at a volume ratio of 6:7:7, the same procedure as in Example 2 was carried out to prepare lithium secondary batteries in Examples 4-4 to 4-8, respectively.

Examples 4-9 and 4-10

The same procedures as in Examples 2-10 and 2-11 were carried out to prepare lithium transition metal composite oxides $LiNi_{0.60}Mn_{0.40}O_2$ and $LiNi_{0.50}Mn_{0.50}O_2$ for use in Examples 4-9 and 4-10, respectively.

Except that each of the lithium transition metal composite oxides was used as the positive active material, and as the solvent of the nonaqueous electrolyte, a mixed solvent of EC/PC/EMC at a volume ratio of 25:5:70 was used in place of the mixed solvent of EC/EMC/DMC at a volume ratio of 6:7:7, the same procedure as in Example 2 was carried out to prepare lithium secondary batteries in Examples 4-9 and 4-10, respectively.

Reference Examples 4-1 to 4-3

The same procedure as in Example 2-1 was carried out to prepare a lithium transition metal composite oxide $LiNi_{0.45}Co_{0.25}Mn_{0.30}O_2$ for use in each of Reference Examples 4-1 to 4-3.

Except that the lithium transition metal composite oxide was used as the positive active material, and as the solvent of the nonaqueous electrolyte, a mixed solvent of EC/EMC at a volume ratio of 30:70, a mixed solvent of EC/fluoroethylene carbonate (FEC)/EMC at a volume ratio of 25:5:70 and a mixed solvent of EC/FEC/EMC at a volume ratio of 20:10:70 were used in place of the mixed solvent of EC/EMC/DMC at a volume ratio of 6:7:7, the same procedure as in Example 2 was carried out to prepare lithium secondary batteries in Reference Examples 4-1 to 4-3, respectively.

Comparative Examples 4-1 to 4-4

The same procedure as in Comparative Examples 2-1 to 2-4 was carried out to prepare a lithium transition metal composite oxide $LiNi_{0.45}Co_{0.25}Mn_{0.30}O_2$ for use in each of Comparative Examples 4-1 to 4-4.

Except that the lithium transition metal composite oxide was used as the positive active material, and as the solvent of the nonaqueous electrolyte, a mixed solvent of EC/PC/EMC at a volume ratio of 25:5:70 was used in place of the mixed solvent of EC/EMC/DMC at a volume ratio of 6:7:7, the same procedure as in Example 2 was carried out to prepare lithium secondary batteries in Comparative Examples 4-1 to 4-4, respectively.

Comparative Example 4-5

The same procedure as in Comparative Example 2-4 was carried out to prepare a lithium transition metal composite oxide $LiNi_{0.45}Co_{0.25}Mn_{0.30}O_2$ for use in Comparative Example 4-4.

Except that the lithium transition metal composite oxide was used as the positive active material, and as the solvent of the nonaqueous electrolyte, a mixed solvent of EC/EMC at a volume ratio of 30:70 was used in place of the mixed solvent of EC/EMC/DMC at a volume ratio of 6:7:7, the same procedure as in Example 2 was carried out to prepare a lithium secondary battery in Comparative Example 4-5.

The prepared lithium secondary battery was subjected to an initial charge-discharge step at 25° C. Charge was constant current constant voltage charge with a current of 0.1 C and a voltage of 4.35 V, and the charge termination condition was set at a time point at which the current value decreased to 1/6. Discharge was constant current discharge with a current of 0.1 C and a final voltage of 2.0 V. This charge-discharge was carried out 2 cycles. Here, a quiescent period of 10 minutes was provided each after charge and after discharge.

<Measurement of Capacity Recovery Rate>

For the lithium secondary batteries in Examples 4-1 to 4-10, Reference Examples 4-1 to 4-3 and Comparative Examples 4-1 to 4-5, the capacity recovery rate was measured in accordance with the above-described procedure.

<Measurement of Resistance Increase Rate>

For the lithium secondary batteries in Examples 4-1 to 4-10, Reference Examples 4-1 to 4-3 and Comparative Examples 4-1 to 4-5, the resistance increase rate was measured in accordance with the above-described procedure.

Table 4 shows the types of positive active materials used for lithium secondary batteries and the test results of the lithium secondary batteries (capacity recovery rate and resistance increase rate) in Examples 4-1 to 4-10, Reference Examples 4-1 to 4-3 and Comparative Examples 4-1 to 4-5.

TABLE 4

|  | Positive active material | Full width at half maximum (104) [degree] | Porosity [%] | Composition of electrolyte solution | Capacity recovery rate [%] | Resistance increase rate [%] |
|---|---|---|---|---|---|---|
| Example 4-1 | Same as in Example 2-1 | 0.145 | 3.5 | EC/PC/EMC = 25/5/70 | 93 | 5.8 |
| Example 4-2 | Same as in Example 2-1 | 0.145 | 3.5 | EC/PC/EMC = 20/10/70 | 93 | 9.1 |
| Example 4-3 | Same as in Example 2-1 | 0.145 | 3.5 | EC/PC/EMC = 27/3/70 | 93 | 5.9 |
| Example 4-4 | Same as in Example 2-2 | 0.140 | 3.1 | EC/PC/EMC = 25/5/70 | 93 | 5.7 |
| Example 4-5 | Same as in Example 2-3 | 0.136 | 2.6 | EC/PC/EMC = 25/5/70 | 94 | 5.7 |
| Example 4-6 | Same as in Example 2-4 | 0.132 | 2.2 | EC/PC/EMC = 25/5/70 | 93 | 5.7 |
| Example 4-7 | Same as in Example 2-5 | 0.128 | 1.8 | EC/PC/EMC = 25/5/70 | 93 | 5.7 |
| Example 4-8 | Same as in Example 2-6 | 0.125 | 1.5 | EC/PC/EMC = 25/5/70 | 94 | 5.8 |
| Example 4-9 | Same as in Example 2-10 | 0.127 | 1.7 | EC/PC/EMC = 25/5/70 | 93 | 5.8 |
| Example 4-10 | Same as in Example 2-11 | 0.126 | 1.6 | EC/PC/EMC = 25/5/70 | 93 | 5.8 |
| Reference Example 4-1 | Same as in Example 2-1 | 0.145 | 3.5 | EC/EMC = 30/70 | 80 | 8.0 |
| Reference Example 4-2 | Same as in Example 2-1 | 0.145 | 3.5 | EC/FEC/EMC = 25/5/70 | 83 | 8.0 |
| Reference Example 4-3 | Same as in Example 2-1 | 0.145 | 3.5 | EC/FEC/EMC = 20/10/70 | 82 | 8.2 |
| Comparative Example 4-1 | Same as in Comparative Example 2-1 | 0.148 | 3.9 | EC/PC/EMC = 25/5/70 | 77 | 9.7 |
| Comparative Example 4-2 | Same as in Comparative Example 2-2 | 0.121 | 2.5 | EC/PC/EMC = 25/5/70 | 79 | 9.6 |
| Comparative Example 4-3 | Same as in Comparative Example 2-3 | 0.132 | 4.2 | EC/PC/EMC = 25/5/70 | 78 | 9.7 |
| Comparative Example 4-4 | Same as in Comparative Example 2-4 | 0.132 | 3.7 | EC/PC/EMC = 25/5/70 | 79 | 9.5 |
| Comparative Example 4-5 | Same as in Comparative Example 2-4 | 0.132 | 3.7 | EC/EMC = 30/70 | 79 | 9.5 |

From Table 4, it is apparent that the nonaqueous electrolyte batteries of Examples 4-1 to 4-10 in which the positive electrode containing the positive active material according to this embodiment (Example 2) is combined with the nonaqueous electrolyte containing propylene carbonate have an improved capacity recovery rate and a reduced resistance increase rate as compared to the nonaqueous electrolyte batteries of Reference Examples 4-1 to 4-3 which include a positive electrode containing the same positive active material and which includes a nonaqueous electrolyte that does not contain propylene carbonate. Even when a nonaqueous electrolyte containing propylene carbonate is used, the capacity recovery rate is not improved, and the resistance increase rate is not suppressed when the positive electrode does not contain the positive active material according to this embodiment (see Comparative Examples 4-1 to 4-5). The content of propylene carbonate is preferably less than 10% by volume, more preferably 5% by volume or less. By using a nonaqueous electrolyte containing propylene carbonate in an amount of less than 10% by volume, the capacity recovery rate is improved, and the resistance increase rate is suppressed.

Preferably, the first embodiment and the second embodiment of the present invention described in this specification are implemented in combination for further improving charge-discharge cycle performance. Preferably, the first embodiment and the third embodiment of the present invention described in this specification are implemented in combination for further improving charge-discharge cycle performance. Preferably, the second embodiment and the third embodiment of the present invention described in this specification are implemented in combination for further improving charge-discharge cycle performance. Preferably, the first embodiment, the second embodiment and the third embodiment of the present invention described in this specification are implemented in combination for further improving charge-discharge cycle performance.

INDUSTRIAL APPLICABILITY

By using a positive active material containing a lithium transition metal composite oxide according to the present invention, cracks of active material particles are suppressed, so that a lithium secondary battery excellent in charge-discharge cycle performance can be provided, and therefore the lithium secondary battery is useful as a lithium secondary battery for hybrid cars and electric cars.

DESCRIPTION OF REFERENCE SIGNS

1: Lithium secondary battery
2: Electrode group
3: Battery container
4: Positive electrode terminal
4': Positive electrode lead
5: Negative electrode terminal
5': Negative electrode lead
20: Energy storage unit
30: Energy storage apparatus

The invention claimed is:

1. A positive active material for a lithium secondary battery which comprises a lithium transition metal composite oxide,
   wherein the lithium transition metal composite oxide has an $\alpha$-NaFeO$_2$ structure, and
   has a diffraction peak at $2\theta=44\pm1°$ and a diffraction peak at $2\theta=18.6\pm1°$ in a powder X-ray diffraction diagram using a CuK$\alpha$ ray, and
   in a ratio FWHM (003)/FWHM (104) of a full width at half maximum FWHM (003) for the diffraction peak at $18.6\pm1°$ to a full width at half maximum FWHM (104)

for the diffraction peak at 44±1°, a ratio of FWHM (003)/FWHM (104) in a charge state immediately after a discharge state to FWHM (003)/FWHM (104) in the discharge state is 0.72 or more and 0.80 or less.

2. The positive active material for a lithium secondary battery according to claim 1, wherein the lithium transition metal composite oxide contains Ni and Mn or Ni, Co and Mn as a transition metal element (Me).

3. The positive active material for a lithium secondary battery according to claim 2, wherein the lithium transition metal composite oxide is represented by the composition formula: $Li_{1+x}Me_{1-x}O_2$ (Me is a transition metal element containing Ni and Mn, or Ni, Co and Mn), and a molar ratio Li/Me of Li to Me, i.e. $(1+x)/(1-x)$ is 1.0 or more and 1.1 or less.

4. The positive active material for a lithium secondary battery according to claim 1, wherein the lithium transition metal composite oxide contains at least one selected from the group consisting of F, S and P on surfaces of particles of the lithium transition metal composite oxide.

5. A method for producing a precursor to be used in production of the positive active material according to claim 1 for a lithium secondary battery which includes a lithium transition metal composite oxide,
the method comprising precipitating a transition metal compound in a fluorine ion-containing solution to produce a precursor of a lithium transition metal composite oxide having an $\alpha$-$NaFeO_2$ structure.

6. The method for producing a precursor according to claim 5, wherein the fluorine ion-containing solution contains ammonium ions.

7. The method for producing a precursor according to claim 5, wherein the lithium transition metal composite oxide is an oxide containing Ni and Mn or Ni, Co and Mn as a transition metal element, and the transition metal compound contains Ni and Mn or Ni, Co and Mn as transition metals.

8. A method for producing a positive active material for a lithium secondary battery which includes a lithium transition metal composite oxide, the method comprising adding a lithium compound and a sintering aid in a precursor produced by the method for producing a precursor according to claim 5, and firing the mixture to produce a lithium transition metal composite oxide having an $\alpha$-$NaFeO_2$ structure.

9. The method for producing a positive active material for a lithium secondary battery according to claim 8, wherein the sintering aid is lithium fluoride, lithium sulfate or lithium phosphate.

10. The method for producing a positive active material for a lithium secondary battery according to claim 8, wherein a temperature for firing the precursor is 900 to 1000° C.

11. A positive electrode for a lithium secondary battery which comprises the positive active material for a lithium secondary battery according to claim 1.

12. A lithium secondary battery comprising a positive electrode, a negative electrode and a nonaqueous electrolyte, the positive electrode including the positive electrode according to claim 11.

13. The lithium secondary battery according to claim 12, wherein the nonaqueous electrolyte contains propylene carbonate.

14. A positive active material for a lithium secondary battery which comprises a lithium transition metal composite oxide,
wherein the lithium transition metal composite oxide has an $\alpha$-$NaFeO_2$ structure, and
has a diffraction peak at $2\theta=44\pm1°$ and a diffraction peak at $2\theta=18.6\pm1°$ in a powder X-ray diffraction diagram using a CuK$\alpha$ ray,
in a ratio FWHM (003)/FWHM (104) of a full width at half maximum FWHM (003) for the diffraction peak at 18.6±1° to a full width at half maximum FWHM (104) for the diffraction peak at 44±1°, a ratio of FWHM (003)/FWHM (104) in a charge state immediately after a discharge state to FWHM (003)/FWHM (104) in the discharge state is 0.72 or more, and
the lithium transition metal composite oxide contains at least one selected from the group consisting of F, S and P on surfaces of particles of the lithium transition metal composite oxide.

* * * * *